United States Patent
Terada et al.

(10) Patent No.: US 9,008,186 B2
(45) Date of Patent: Apr. 14, 2015

(54) IMAGE CODING METHOD, IMAGE DECODING METHOD, IMAGE CODING APPARATUS, IMAGE DECODING APPARATUS, IMAGE CODING AND DECODING APPARATUS

(71) Applicant: Panasonic Intellectual Property Corporation of America, Torrance, CA (US)

(72) Inventors: Kengo Terada, Osaka (JP); Youji Shibahara, Osaka (JP); Kyoko Tanikawa, Osaka (JP); Hisao Sasai, Osaka (JP); Toshiyasu Sugio, Osaka (JP); Toru Matsunobu, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 14/016,616

(22) Filed: Sep. 3, 2013

(65) Prior Publication Data

US 2014/0064381 A1  Mar. 6, 2014

Related U.S. Application Data

(60) Provisional application No. 61/697,330, filed on Sep. 6, 2012.

(51) Int. Cl.
*H04N 7/12* (2006.01)
*H04N 19/90* (2014.01)
(Continued)

(52) U.S. Cl.
CPC .......... *H04N 19/00945* (2013.01); *H04N 19/70* (2014.01); *H04N 19/463* (2014.01)

(58) Field of Classification Search
None
See application file for complete search history.

(56) References Cited

U.S. PATENT DOCUMENTS

2006/0171458 A1* 8/2006 Feng et al. ............... 375/240.03
2006/0209952 A1  9/2006 Tanizawa et al.
(Continued)

FOREIGN PATENT DOCUMENTS

| JP | 2006-262004 | 9/2006 |
| JP | 2007-520165 | 7/2007 |
| WO | 2005/076614 | 8/2005 |

OTHER PUBLICATIONS

International Search Report issued Sep. 17, 2013 in corresponding International Application No. PCT/JP2013/004794.
(Continued)

*Primary Examiner* — Joseph Ustaris
*Assistant Examiner* — Zhubing Ren
(74) *Attorney, Agent, or Firm* — Wenderoth, Lind & Ponack, L.L.P.

(57) ABSTRACT

An image coding method includes: coding (i) coefficient information, (ii) a first flag indicating whether to quantize one or more blocks using quantization, (iii) a second flag indicating whether the plurality of quantization matrices are included in a sequence parameter set, and (iv) a third flag indicating whether the plurality of quantization matrices are included in a picture parameter set; and quantizing the plurality of coefficients, wherein when the one or more blocks are quantized using a plurality of default matrices, the following are coded in the coding: (i) the first flag indicating that the one or more blocks are quantized using the plurality of quantization matrices, (ii) the second flag indicating that the plurality of quantization matrices are not included in the sequence parameter set, and (iii) the third flag indicating that the plurality of quantization matrices are not included in the picture parameter set.

3 Claims, 37 Drawing Sheets

(51) Int. Cl.
  *H04N 19/463* (2014.01)
  *H04N 19/70* (2014.01)

(56) References Cited

U.S. PATENT DOCUMENTS

2007/0189626 A1* 8/2007 Tanizawa et al. ............. 382/251
2008/0089410 A1   4/2008 Lu et al.

OTHER PUBLICATIONS

ISO/IEC 14496-10 (MPEG-4 Part10: Advanced Video Coding), Oct. 1, 2004.
Benjamin Bross et al., "High efficiency video coding (HEVC) text specification draft 8", Joint Collaborative Team on Video Coding (JCT-VC) of ITU-T SG16 WP3 and ISO/IEC JTC1/SC29/WG11, JCTVC-J1003_d7, Ver.8, 10th Meeting: Stockholm, SE, Jul. 11-20, 2012.

* cited by examiner

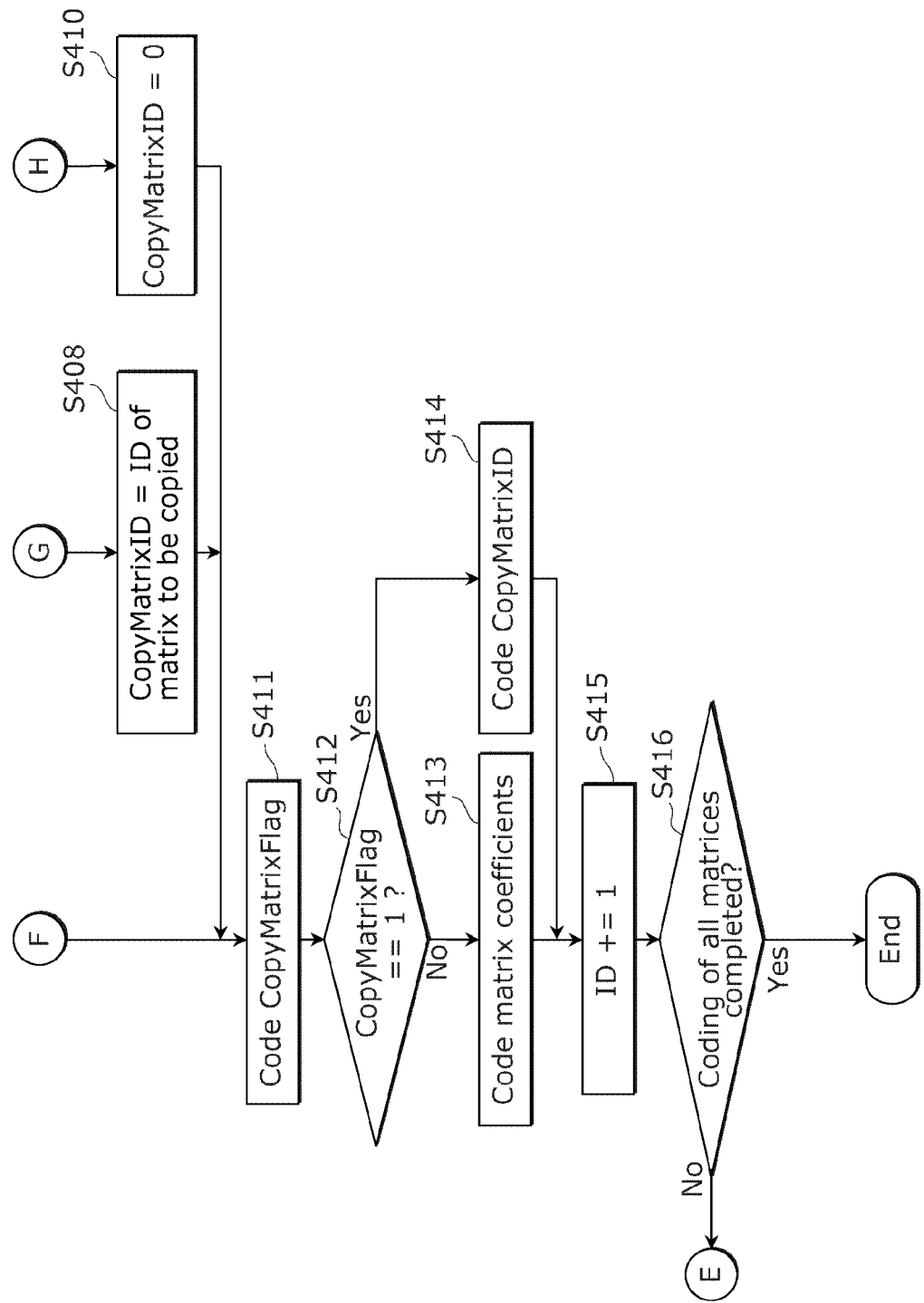

FIG. 21

- Video stream (PID=0x1011, Primary video)
- Audio stream (PID=0x1100)
- Audio stream (PID=0x1101)
- Presentation graphics stream (PID=0x1200)
- Presentation graphics stream (PID=0x1201)
- Interactive graphics stream (PID=0x1400)
- Video stream (PID=0x1B00, Secondary video)
- Video stream (PID=0x1B01, Secondary video)

FIG. 24
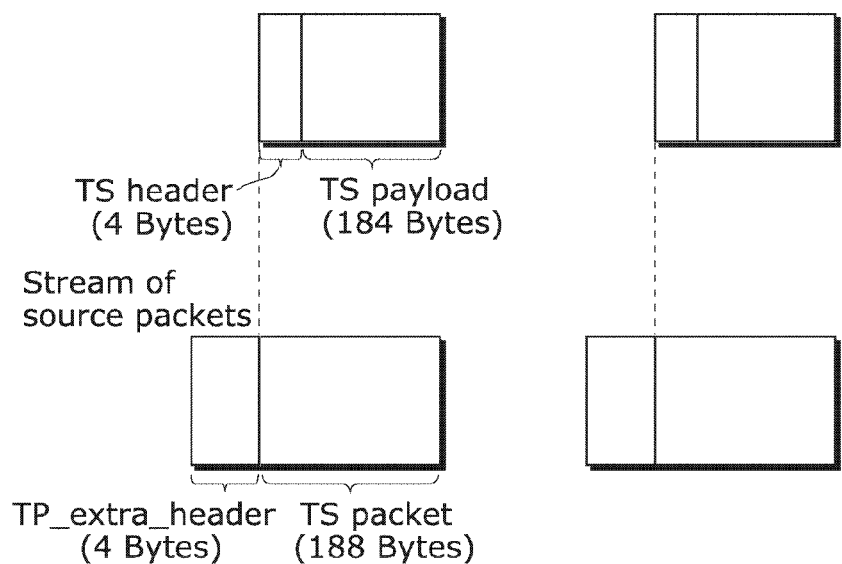
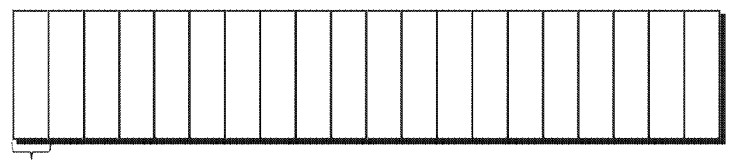

FIG. 32

| Corresponding standard | Driving frequency |
|---|---|
| MPEG-4 AVC | 500 MHz |
| MPEG-2 | 350 MHz |
| ⋮ | ⋮ |

IMAGE CODING METHOD, IMAGE DECODING METHOD, IMAGE CODING APPARATUS, IMAGE DECODING APPARATUS, IMAGE CODING AND DECODING APPARATUS

CROSS REFERENCE TO RELATED APPLICATION

The present application claims the benefit of U.S. Provisional Patent Application No. 61/697,330 filed Sep. 6, 2012. The entire disclosures of the above-identified application, including the specification, drawings and claims are incorporated herein by reference in their entirety.

FIELD

The present disclosure relates to an image coding method for coding images or an image decoding method for decoding images.

BACKGROUND

A technique disclosed in Non-patent Literature 1 is a technique related to an image coding method for coding images (including videos) or an image decoding method for decoding images.

CITATION LIST

Non Patent Literature

[NPL 1]
ISO/IEC 14496-10 "MPEG-4 Part 10 Advanced Video Coding"

SUMMARY

Technical Problem

However, an inefficient image coding method or an inefficient image decoding method may be used in some cases.

Non-limiting exemplary embodiments disclosed here provide an image coding method for coding an image efficiently and an image decoding method for decoding an image efficiently.

Solution to Problem

An image coding method according to an aspect of the present invention is an image coding method for coding an image, the image coding method includes: coding (i) coefficient information indicating a plurality of coefficients of one or more blocks included in the image, (ii) a first flag indicating whether or not to quantize the one or more blocks using a plurality of quantization matrices each having coefficients respectively corresponding to the plurality of coefficients of the one or more blocks, (iii) a second flag indicating whether or not the plurality of quantization matrices are included in a sequence parameter set, and (iv) a third flag indicating whether or not the plurality of quantization matrices are included in a picture parameter set; and quantizing the plurality of coefficients, wherein when the one or more blocks are quantized in the quantizing using a plurality of default matrices as the plurality of quantization matrices, the following are coded in the coding: (i) the first flag indicating that the one or more blocks are quantized using the plurality of quantization matrices, (ii) the second flag indicating that the plurality of quantization matrices are not included in the sequence parameter set, and (iii) the third flag indicating that the plurality of quantization matrices are not included in the picture parameter set.

These general and specific aspects may be implemented using a system, an apparatus, an integrated circuit, a computer program, or a non-transitory computer-readable recording medium such as a CD-ROM, or any combination of systems, apparatuses, integrated circuits, computer programs, or recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

The image coding method and the image decoding method according to the present disclosure make it possible to code and decode images efficiently.

BRIEF DESCRIPTION OF DRAWINGS

These and other objects, advantages and features of the invention will become apparent from the following description thereof taken in conjunction with the accompanying drawings that illustrate a specific embodiment of the present invention.

FIG. 6B is a diagram showing a flow (subsequent to the flow) of the coding of the matrix data according to Embodiment 1.

FIG. 21 illustrates a structure of multiplexed data.

FIG. 24 shows a structure of TS packets and source packets in the multiplexed data.

FIG. 32 shows an example of a look-up table in which video data standards are associated with driving frequencies.

Figure 1:
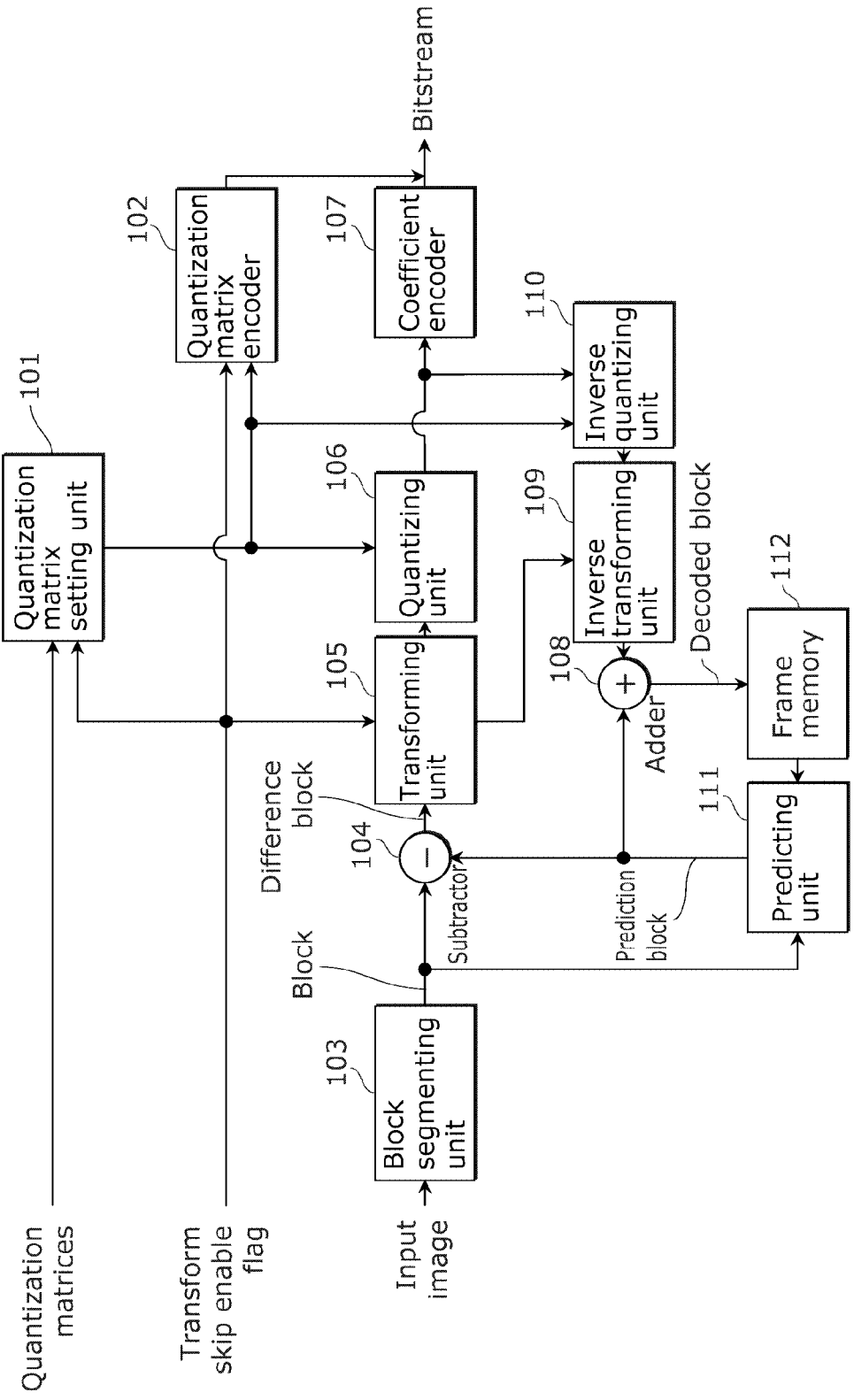
FIG. 1 is a diagram showing a structure of an image coding apparatus according to Embodiment 1.

DESCRIPTION OF EMBODIMENTS (Underlying Knowledge Forming Basis of the Present Disclosure)

The Inventors found problems of the image coding apparatus which codes images and the image decoding apparatus which decodes images described in the Background section. These problems are described below in detail.

In recent years, significant technical advancement in digital video apparatuses have increased cases of compression-coding video signals (of a plurality of pictures arranged in temporal order) input from video cameras or television tuners and recording them onto recording media such as DVDs, hard disks, or the like.

Coding of a video signal includes a step of predicting an image, a step of calculating a difference between a prediction image and a coding target image, a step of transforming a difference image into frequency coefficients, a step of quantizing the frequency coefficients, and a step of variable-length coding the quantized coefficients, prediction information, and the like.

The quantization may involve use of quantization matrices. Here, an increased coding efficiency is obtained by performing rough quantization on high frequency coefficients which are not visually noticeable if the image quality decreases and performing fine quantization on low frequency coefficients which are visually noticeable if the image quality decreases. In addition, the quantization further involves use of several kinds of quantization matrices for (i) frequency transform sizes of 4×4, 8×8, or the like, (ii) prediction modes such as intra-frame prediction modes and inter-frame prediction modes, and (iii) pixel components such as luminance components and chrominance components. It is to be noted that quantization means digitalization of values sampled at predetermined intervals, in association with predetermined levels. In this technical field, expressions such as truncation, rounding, and scaling may be used to mean quantization.

Examples of methods using quantization matrices include a method using quantization matrices directly set by an image coding apparatus and a method using default quantization matrices (default matrices). The image coding apparatus is capable of setting quantization matrices suitable for image features by directly setting the ones. However, in this case, the image coding apparatus has a disadvantage of inevitably increasing the amount of codes required for coding the quantization matrices.

On the other hand, there is a method for quantizing high frequency components and low frequency components in the same manner without using such quantization matrices. It is to be noted that this method is equal to a method using quantization matrices (flat matrices) in which all the components have the same value.

In the video coding standard called H.264/AVC or MPEG-4 AVC (see Non-patent Literature 1), quantization matrices are specified using a Sequence Parameter Set (SPS) or a Picture Parameter Set (PPS). The SPS includes a parameter which is used for a sequence, and the PPS includes a parameter which is used for a picture. The SPS and PPS may be simply referred to as parameter sets.

Quantization matrices are set using MatrixPresentFlag and ListPresentFlag in each of the SPS and PPS. When the MatrixPresentFlag in the SPS indicates 0, no quantization matrix is used, and high frequency components and low frequency components are quantized in the same manner. On the other hand, when the MatrixPresentFlag in the SPS indicates 1, quantization matrices for a target sequence are set using ListPresentFlag.

Quantization matrices are prepared according to frequency transform sizes, prediction modes, and pixel components. Each of the quantization matrices is assigned with ListPresentFlag indicating whether or not to use default quantization matrices. When the default quantization matrices are not used, quantization matrices to be used are coded using another syntax.

In addition, when MatrixPresentFlag of a PPS indicates 0, information of the quantization matrices which have been set using the SPS is used. When MatrixPresentFlag of a PPS indicates 1, quantization matrices for a target picture are set using ListPresentFlag. The ListPresentFlag of each PPS indicates whether or not to use the default quantization matrices, in the same manner as the ListPresentFlag of a corresponding SPS.

Here, for example, when only default quantization matrices are used, the MatrixPresentFlag of at least one of the SPS and the PPS is set to 1. In addition, the ListPresentFlag corresponding to the quantization matrices are set to 0 and coded. In other words, some amount of codes is required to code the flags even when the amount of codes required to code the quantization matrices is reduced using the default quantization matrices. Accordingly, it is difficult to increase the coding efficiency.

In view of this, an image coding method according to an aspect of the present invention is an image coding method for coding an image, the image coding method includes: coding (i) coefficient information indicating a plurality of coefficients of one or more blocks included in the image, (ii) a first flag indicating whether or not to quantize the one or more blocks using a plurality of quantization matrices each having coefficients respectively corresponding to the plurality of coefficients of the one or more blocks, (iii) a second flag indicating whether or not the plurality of quantization matrices are included in a sequence parameter set, and (iv) a third flag indicating whether or not the plurality of quantization matrices are included in a picture parameter set; and quantizing the plurality of coefficients, wherein when the one or more blocks are quantized in the quantizing using a plurality of default matrices as the plurality of quantization matrices, the following are coded in the coding: (i) the first flag indicating that the one or more blocks are quantized using the plurality of quantization matrices, (ii) the second flag indicating that the plurality of quantization matrices are not included in the sequence parameter set, and (iii) the third flag indicating that the plurality of quantization matrices are not included in the picture parameter set.

In this way, these three flags control use or unuse of the plurality of default matrices. Accordingly, it is possible to increase the coding efficiency. In addition, the use of the default matrices is shown by the fact that the sequence parameter set and the picture parameter set do not include any quantization matrix; Accordingly, error resistance is increased.

For example, when the one or more blocks may be quantized in the quantizing using a plurality of flat matrices each having same coefficients instead of the plurality of quantization matrices, the first flag indicating that the plurality of quantization matrices are not quantized is coded in the coding.

In this way, it is possible to use, for quantization processes, flat matrices each having the same coefficients.

In addition, for example, when the one or more blocks are quantized in the quantizing using the plurality of quantization matrices, in the coding: the following may be coded: (i) the first flag indicating that the one or more blocks are quantized using the plurality of quantization matrices, and (ii) the second flag indicating that the plurality of quantization matrices are included in the sequence parameter set, or the third flag indicating that the plurality of quantization matrices are included in the picture parameter set; the plurality of quantization matrices may be included in the sequence parameter set when the second flag indicating that the plurality of quantization matrices are included in the sequence parameter set is coded; and the plurality of quantization matrices may be included in the picture parameter set when the third flag indicating that the plurality of quantization matrices are included in the picture parameter set is coded.

In this way, the image coding apparatus and the image decoding apparatus can use the same quantization matrices when not to using the default matrices.

In addition, for example, in the coding: when the plurality of quantization matrices included in a parameter set which is one of the sequence parameter set and the picture parameter set includes a first quantization matrix and a second quantization matrix, and the first quantization matrix is equal to the second quantization matrix, an identifier indicating the second quantization matrix may be included, in the parameter set, as a copy matrix identifier indicating a matrix whose copy is used as the first quantization matrix; and when the plurality of quantization matrices included in the parameter set includes the first quantization matrix, and the first quantization matrix is equal to one of the default matrices, an identifier indicating the default matrix may be included as the copy matrix identifier in the parameter set.

In this way, it is possible to use the default matrices adaptively when using the plurality of quantization matrices included in the parameter sets. In addition, it is possible to increase the coding efficiency.

In addition, for example, the image coding method may include: setting a plurality of sequence quantization matrices for a sequence including a picture; and setting a plurality of picture quantization matrices for the picture, wherein in the coding: the first flag may be coded which indicates that the one or more blocks are quantized using the plurality of quantization matrices, when the one or more blocks of the picture are quantized using, as the plurality of quantization matrices, the plurality of picture quantization matrices which have been set for the picture; the second flag may be coded which indicates that the plurality of quantization matrices are not included in the sequence parameter set, when the plurality of default matrices have been set for the sequence as the plurality of sequence quantization matrices; and the third flag may be coded which indicates that the plurality of quantization matrices are not included in the picture parameter set, when the plurality of sequence quantization matrices which have been set for the sequence are set for the picture as the plurality of picture quantization matrices.

In this way, it is possible to use the default matrices as sequence quantization matrices, and to use the sequence quantization matrices as picture quantization matrices.

In addition, for example, when a block not subject to transform is quantized using a flat matrix having same coefficients, and a block subject to transform is quantized using one of the default matrices, the following may be coded in the coding: (i) the first flag indicating that the one or more blocks are quantized using the plurality of quantization matrices; (ii) the second flag indicating that the plurality of quantization matrices are not included in the sequence parameter set; and (iii) the third flag indicating that the plurality of quantization matrices are not included in the picture parameter set.

In this way, the flat matrices are used instead of the default matrices for the block not subject to transform even when using the default matrices. Accordingly, the quantization processes are performed appropriately.

Furthermore, an image decoding method according to an aspect of the present disclosure is an image decoding method for decoding a coded bitstream to decode an image, the image decoding method may include: decoding, from the coded bitstream, (i) coefficient information indicating a plurality of coefficients of one or more blocks included in the image, (ii) a first flag indicating whether or not to inverse-quantize the one or more blocks using a plurality of quantization matrices each having coefficients respectively corresponding to the plurality of coefficients of the one or more blocks, (iii) a second flag indicating whether or not the plurality of quantization matrices are included in a sequence parameter set, and (iv) a third flag indicating whether or not the plurality of quantization matrices are included in a picture parameter set; and inverse-quantizing the coefficient information, wherein when the following may be decoded: (i) the first flag indicating that the one or more blocks are inverse-quantized using the plurality of quantization matrices, (ii) the second flag indicating that the plurality of quantization matrices are not included in the sequence parameter set, and (iii) the third flag indicating that the plurality of quantization matrices are not included in the picture parameter set, the coefficient information may be inverse-quantized in the inverse-quantizing using the plurality of default matrices as the plurality of quantization matrices.

In this way, these three flags control use or unuse of the plurality of default matrices. Accordingly, it is possible to increase the coding efficiency. In addition, the use of the default matrices is shown by the fact that the sequence parameter set and the picture parameter set do not include any quantization matrix. Accordingly, error resistance is increased.

In addition, for example, when the first flag is decoded which indicates that the one or more blocks are not inverse-quantized using the plurality of quantization matrices, the coefficient information may be inverse-quantized in the inverse-quantizing using the plurality of flat matrices each having same coefficients instead of the plurality of quantization matrices.

In this way, it is possible to use, for inverse quantization processes, the flat matrices each having the same coefficients.

In addition, for example, in the inverse-quantizing: the coefficient information may be inverse-quantized using the plurality of quantization matrices included in the sequence parameter set, when the following are decoded: the first flag indicating that the one or more blocks are inverse-quantized using the plurality of quantization matrices and the second flag indicating that the plurality of quantization matrices are included in the sequence parameter set; and the coefficient information may be inverse-quantized using the plurality of quantization matrices included in the picture parameter set, when the following are decoded: the first flag indicating that the one or more blocks are inverse-quantized using the plurality of quantization matrices and the third flag indicating that the plurality of quantization matrices are included in the picture parameter set.

In this way, the image coding apparatus and the image decoding apparatus can use the same quantization matrices when not using the default matrices.

In addition, for example, when a parameter set which is one of the sequence parameter set and the picture parameter set includes the plurality of quantization matrices including a first quantization matrix and a second quantization matrix, and the parameter set includes an identifier indicating the second quantization matrix as a copy matrix identifier indicating a matrix whose copy is used as the first quantization matrix, the coefficient information may be inverse-quantized in the inverse-quantizing using the plurality of quantization matrices including the first quantization matrix as which a copy of the second quantization matrix is used; and when the parameter set includes the plurality of quantization matrices including the first quantization matrix, and the parameter set includes an identifier indicating one of the default matrices as the copy matrix identifier, the coefficient information may be inverse-quantized in the inverse-quantizing using the plurality of quantization matrices including the first quantization matrix as which a copy of the default matrix is used.

In this way, it is possible to use the default matrices adaptively when using the plurality of quantization matrices included in the parameter sets. In addition, it is possible to increase the coding efficiency.

In addition, for example, the image decoding method may further includes: setting a plurality of sequence quantization matrices for a sequence including a picture; and setting a plurality of picture quantization matrices for the picture, wherein the coefficient information of the picture may be inverse-quantized in the inverse-quantizing using, as the plurality of quantization matrices, the plurality of picture quantization matrices which have been set for the picture, when the first flag is decoded which indicates that the one or more blocks are inverse-quantized using the plurality of quantization matrices, and in the setting: the plurality of default matrices for the sequence may be set as the plurality of sequence quantization matrices, when the second flag is decoded which indicates that the plurality of quantization matrices are not included in the sequence parameter set; and the plurality of sequence quantization matrices which have been set for the sequence may be set for the picture as the plurality of picture quantization matrices, when the third flag is decoded which indicates that the plurality of quantization matrices are not included in the picture parameter set.

In this way, it is possible to use the default matrices as sequence quantization matrices, and to use the sequence quantization matrices as picture quantization matrices.

In addition, for example, when the following are decoded: (i) the first flag indicating that the one or more blocks are inverse-quantized using the plurality of quantization matrices; (ii) the second flag indicating that the plurality of quantization matrices are not included in the sequence parameter set; and (iii) the third flag indicating that the plurality of quantization matrices are not included in the picture parameter set, coefficient information of a block not subject to transform may be inverse-quantized in the inverse-quantizing using a flat matrix having same coefficients, and the coefficient information of a block subject to transform may be inverse-quantized in the inverse-quantizing using one of the default matrices.

In this way, the flat matrices are used instead of the default matrices for the block not subject to transform even when using the default matrices. Accordingly, the quantization processes are performed appropriately.

Furthermore, these general and specific aspects may be implemented using a system, an apparatus, an integrated circuit, a computer program, or a non-transitory computer-readable recording medium such as a CD-ROM, or any combination of systems, apparatuses, integrated circuits, computer programs, or recording media.

Hereinafter, certain exemplary embodiments are described in detail with reference to the Drawings. Each of the exemplary embodiments described below shows a general or specific example. The numerical values, shapes, materials, structural elements, the arrangement and connection of the structural elements, steps, the processing order of the steps etc. shown in the following exemplary embodiments are mere examples, and therefore do not limit the scope of the Claims. Therefore, among the structural elements in the following exemplary embodiments, structural elements not recited in any one of the independent claims defining the most generic concept are described as arbitrary structural elements.

It is to be noted that "coding" is used to mean "encoding" in the descriptions below.

[Embodiment 1]
[Overall Structure]

FIG. 1 shows a structure of an image coding apparatus in this Embodiment. As shown in FIG. 1, the image coding apparatus in this embodiment includes a quantization matrix setting unit 101, a quantization matrix encoder 102, a block segmenting unit 103, a subtractor 104, a transforming unit 105, a quantizing unit 106, a coefficient encoder 107, an adder 108, an inverse transforming unit 109, an inverse quantizing unit 110, a predicting unit 111, and a frame memory 112.

[(Overall) Operations]

Figure 2:
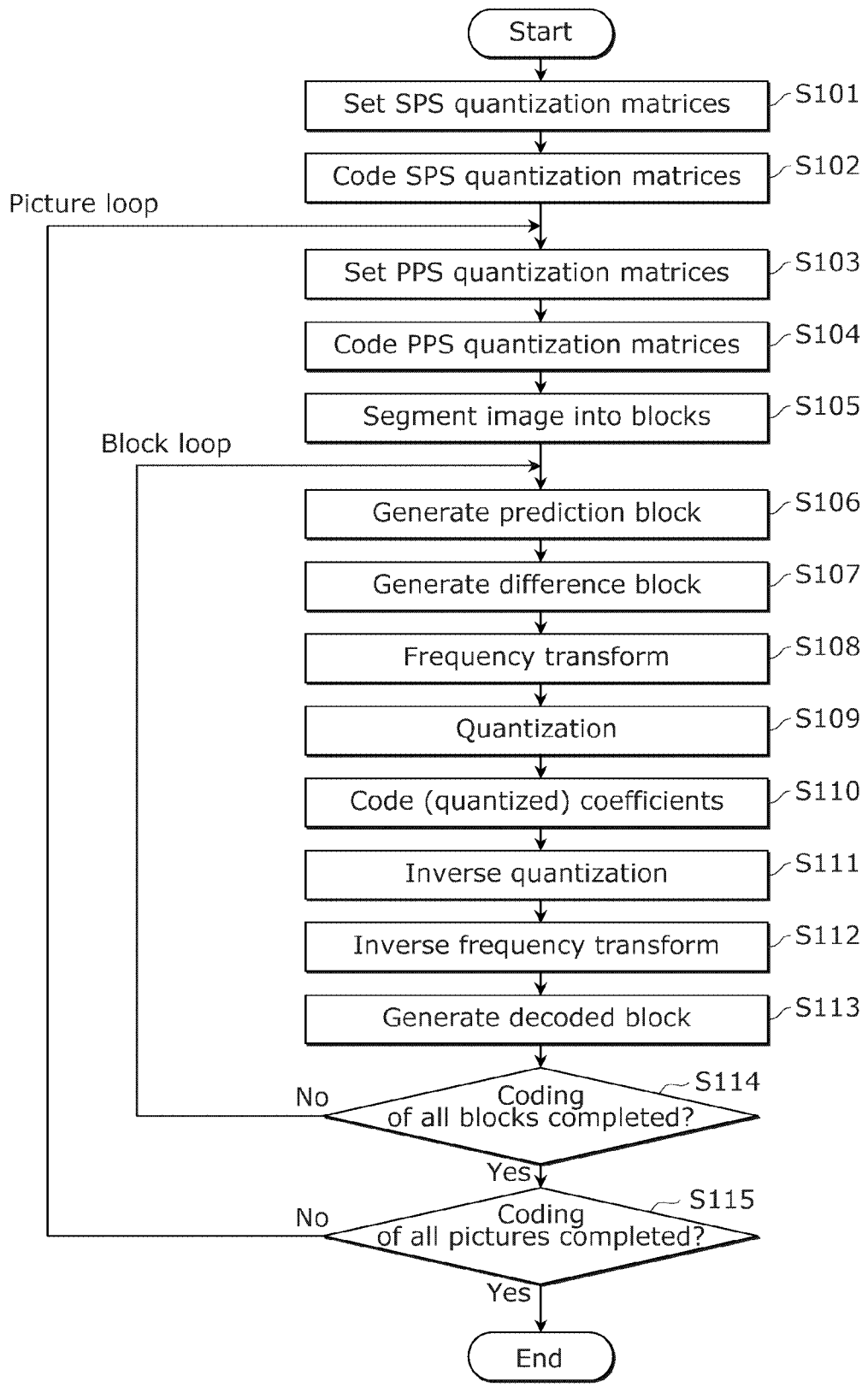
FIG. 2 a diagram showing a flow of overall coding according to Embodiment 1.

Next, a flow of overall coding is described with reference to FIG. 2. First, the quantization matrix setting unit 101 sets SPS quantization matrices (sequence quantization matrices) which are quantization matrices to be used for a target sequence (S101).

The SPS quantization matrices are set, for example, according to inputs from outside, image features, or transform skip enable flags (TransformSkipEnableFlag). The TransformSkipEnableFlag indicates a flag indicating whether or not to allow skipping of a process for transforming image data into frequency components. Skipping the transforming process may increase the coding efficiency. The TransformSkipEnableFlag shows that skipping of a transform process is prohibited when the flag indicates 0, and that skipping of a transform process is allowed when the flag indicates 1.

Next, the quantization matrix encoder 102 codes the SPS quantization matrices (S102). The details are described later. It is to be noted that subsequent processes (S103 to S115) for a picture are performed for each of pictures in a sequence. Accordingly, the subsequent processes are repeated plural times corresponding to the number of pictures in the sequence.

Next, the quantization matrix setting unit 101 sets PPS quantization matrices which are quantization matrices to be used for a target picture (S103). The PPS quantization matrices are set, for example, according to inputs from outside, image features, transform skip enable flags. Next, the quantization matrix encoder 102 codes the PPS quantization matrices (S104). The details are described later.

Next, the block segmenting unit 103 segments the input picture into blocks (coding units), and sequentially outputs the blocks to the subtractor 104 and the predicting unit 111 (S105). The blocks have variable sizes. The block segmenting unit 103 segments the image using the image features. The minimum block size is 8×8 in horizontal and vertical directions, and the maximum block size is 64×64 in horizontal and vertical directions.

It is to be noted that subsequent processes (S106 to S114) for a block are performed for each of blocks in a picture. Accordingly, the subsequent processes are repeated plural times corresponding to the number of blocks in the picture.

Next, the predicting unit 111 generates a prediction block from the block and a decoded image stored in the frame memory 112 (S106). The subtractor 104 generates a difference block from the input image and the prediction block (S107).

Next, the transforming unit 105 transforms the difference block into frequency coefficients (S108). At this time, a transform skip enable flag is input. When the transform skip enable flag indicates 1 (which indicates that skipping of a transform process is allowed), the transforming unit 105 switches between execution or non-execution of a transform process according to features (the size and so on) of the difference block. When not executing any transform process, the transforming unit 105 outputs the difference block as it is to the quantizing unit 106. When executing a transform process, the transforming unit 105 performs a frequency transform process on the difference block and outputs resulting frequency coefficients to the quantizing unit 106.

On the other hand, when the transform skip enable flag indicates 0 (which indicates that skipping of a transform process is prohibited), the transforming unit 105 performs a frequency transform process on the difference block without depending on any feature of the difference block, and outputs resulting frequency coefficients to the quantizing unit 106.

It is to be noted that a transform process is skipped only when the transform size is 4×4. When the transform size is not 4×4, a transform process is performed without depending on any transform skip enable flag. The transform size is a variable size of 4×4 or more, and may be smaller than the size of a block (coding unit).

Next, the quantizing unit 106 quantizes output data from the transforming unit 105 (S109). At this time, the output data is quantized using the PPS quantization matrices which have been set in Step S103. The output data from the transforming unit 105 may be the difference block as it is or the frequency coefficients depending on the transform skip enable flag and the features of the difference block. Next, the coefficient encoder 107 codes the quantized coefficients (S110). The coding used here is variable length coding such as arithmetic coding.

Next, the inverse quantizing unit 110 inverse-quantizes the quantized coefficients to reconstruct the frequency coefficients or the difference block (S111). At this time, the inverse quantizing unit 110 inverse-quantizes the quantized coefficients using the PPS quantization matrices which have been set in Step S103. Inverse quantization is a process for recovering a signal from a quantized signal, and more specifically is a process for recovering highly accurate data from data whose accuracy was decreased in the quantization process. For this reason, inverse quantization may be referred to as scaling as in the case of quantization.

Next, the inverse transforming unit 109 transforms the frequency coefficients into pixel data to reconstruct the difference block (S112). At this time, the transforming unit 105 inputs information indicating whether or not a frequency transform process is skipped for the target block to the inverse transforming unit 109. When the frequency transform process was skipped, an inverse transform process is also skipped.

In this technical field, in general, an inverse quantization process and an inverse transform process are performed at the same time in order to reduce multiplication operations.

Next, the adder 108 adds the reconstructed difference block and the prediction block to generate a decoded block, and stores the decoded block in the frame memory 112 (S113). Hereinafter, the quantization matrix encoder 102 is described in detail. The quantization matrix encoder 102 codes the SPS quantization matrices and the PPS quantization matrices.

[Structure of Quantization Matrix Encoder]

Figure 3:
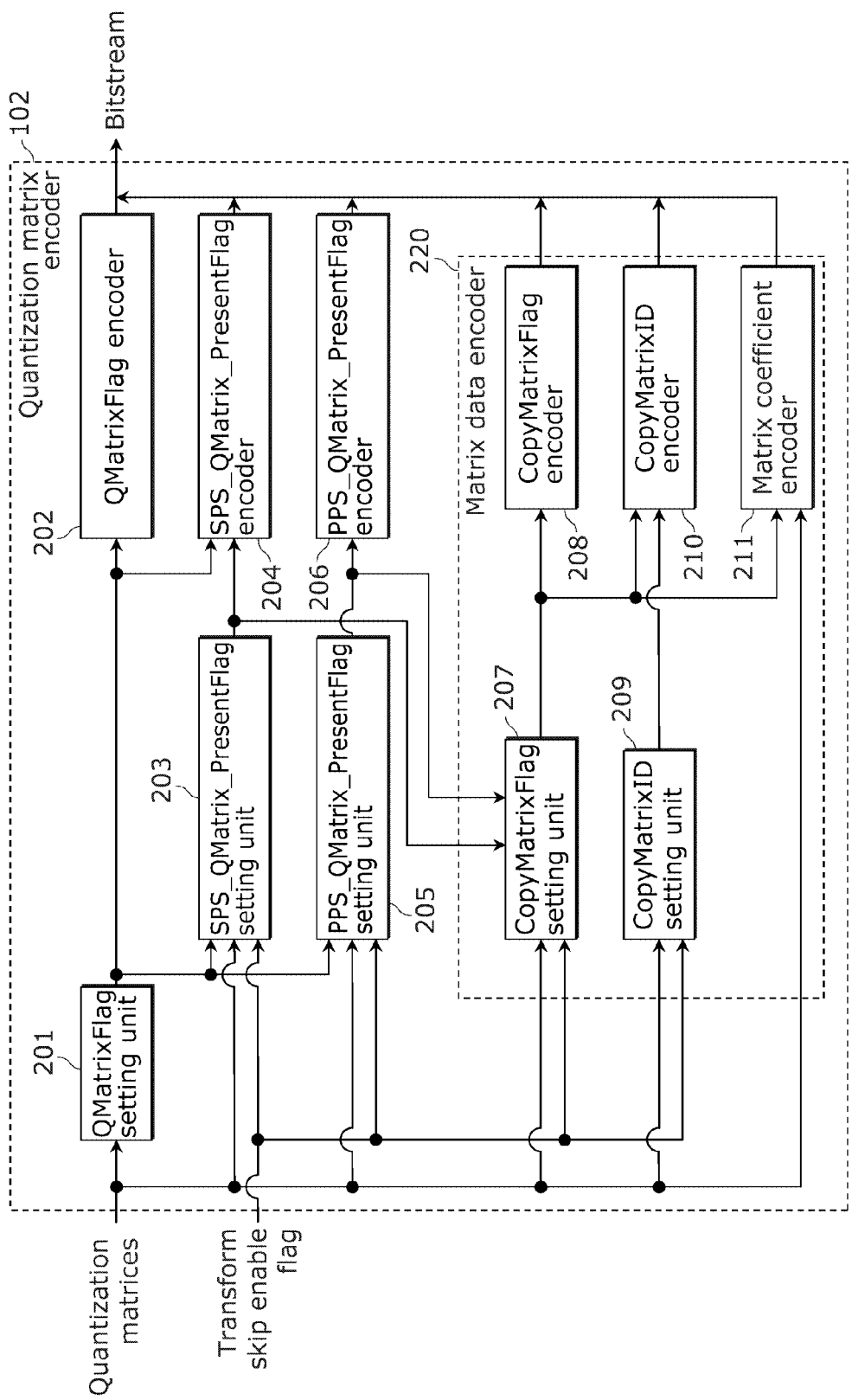
FIG. 3 is a diagram showing an internal structure of a quantization matrix encoder according to Embodiment 1.

FIG. 3 shows an internal structure of the quantization matrix encoder 102 shown in FIG. 1. As shown in FIG. 3, the quantization matrix encoder 102 includes a QMatrixFlag setting unit 201, a QMatrixFlag encoder 202, an SPS_QMatrix_PresentFlag setting unit 203, an SPS_QMatrix_PresentFlag encoder 204, a PPS_QMatrix_PresentFlag setting unit 205, a PPS_QMatrix_PresentFlag encoder 206, and a matrix data encoder 220.

The matrix data encoder 220 includes a CopyMatrixFlag setting unit 207, a CopyMatrixFlag encoder 208, a CopyMatrixID setting unit 209, a CopyMatrixID encoder 210, and a matrix coefficient encoder 211.

[Operations (Coding of SPS Quantization Matrices)]

Next, a flow of coding SPS quantization matrices is described with reference to each of FIG. 4A and FIG. 4B. First, when quantization matrices are used (Yes in S201), the QMatrixFlag setting unit 201 sets the QMatrixFlag to 1 (S203). When no quantization matrix is used (No in S201), the QMatrixFlag setting unit 201 sets the QMatrixFlag to 0 (S202).

The QMatrixFlag (quantization matrix flag) is a flag indicating whether or not to use quantization matrices. More specifically, the QMatrixFlag is a flag indicating whether or not to use the plurality of quantization matrices each having coefficients different for different frequencies in either a quantization process or an inverse quantization process. The QMatrixFlag shows that the quantization matrices are used when the flag indicates 1, and shows that no quantization matrix is used when the flag indicates 0.

Next, when the quantization matrices are used (Yes in S201), the SPS_QMatrix_PresentFlag setting unit 203 sets SPS_QMatrix_PresentFlag according to a transform skip enable flag and the SPS quantization matrices (S204 to S210).

The SPS_QMatrix_PresentFlag (SPS quantization matrix present flag) is a flag indicating whether or not to code the SPS quantization matrices. In other words, the SPS_QMatrix_PresentFlag shows whether or not the SPS includes the quantization matrices to be used in the quantization process or the inverse quantization process. The SPS_QMatrix_PresentFlag shows that the SPS quantization matrices are coded when the flag indicates 1, and shows that no SPS quantization matrix is coded when the flag shows 0.

Figure 4A:
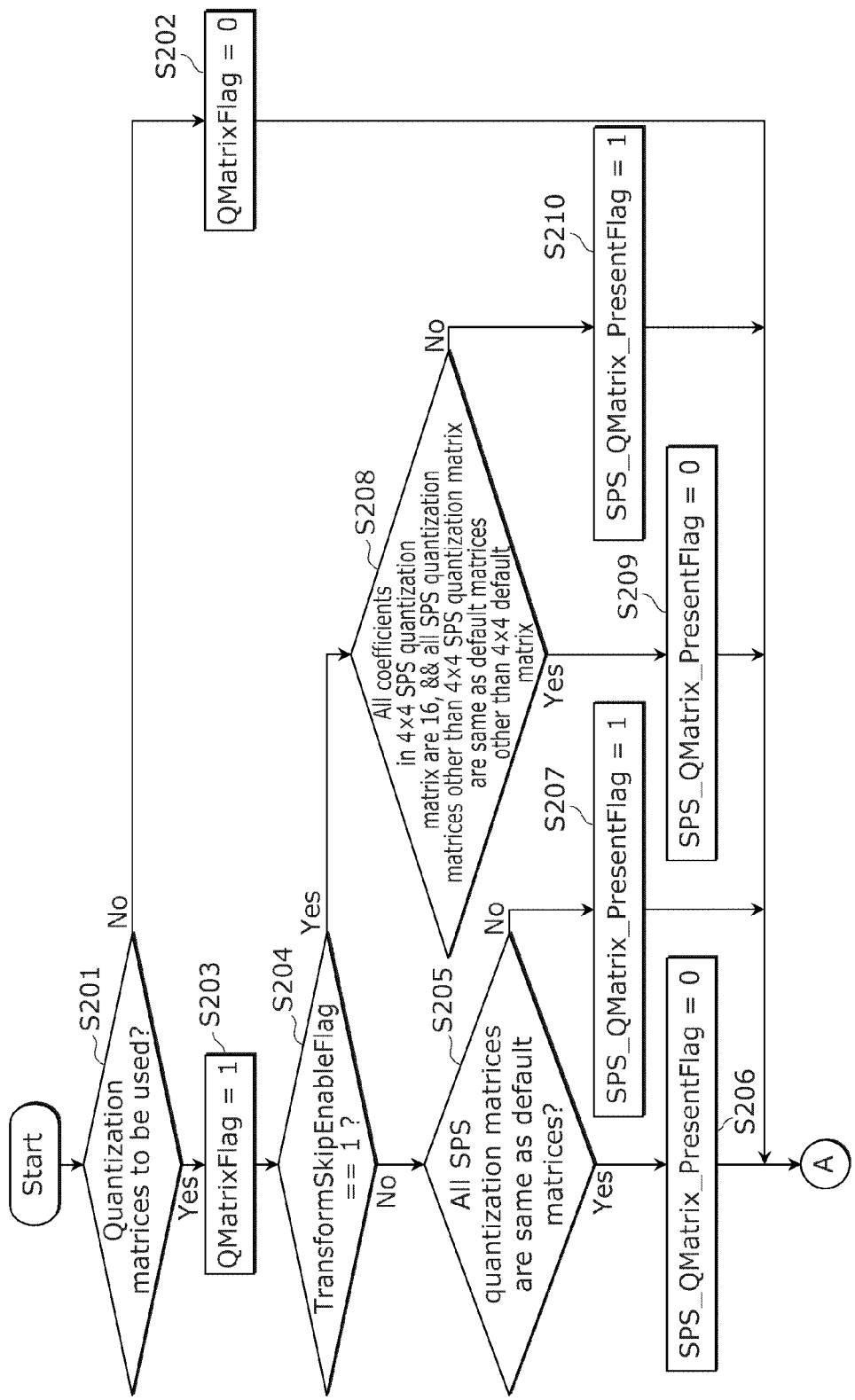
FIG. 4A is a diagram showing a flow of coding SPS quantization matrices according to Embodiment 1.
Figure 4B:
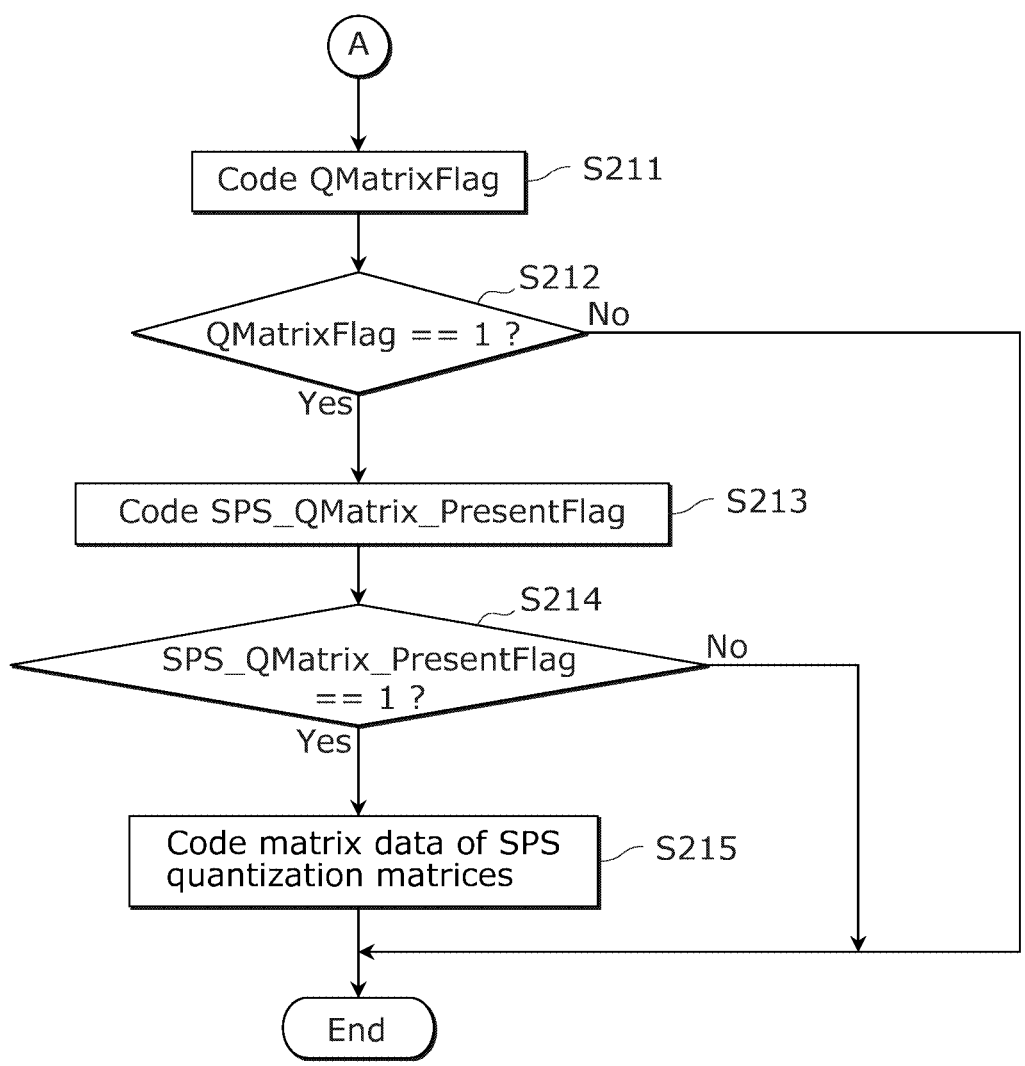
FIG. 4B is a diagram showing a flow (subsequent to the flow) of the coding of the SPS quantization matrices according to Embodiment 1.

In the coding flow in FIG. 4A, when the transform skip enable flag indicates 0 (which indicates that skipping of a transform process is prohibited) (No in S204), a determination is made as to whether or not all the SPS quantization matrices are the same as the default matrices (S205).

It is to be noted that the SPS quantization matrices prepared here vary in kind according to frequency transform sizes of 4×4, 8×8, or the like, prediction modes such as intra-frame prediction modes and inter-frame prediction modes, and pixel components such as luminance components and chrominance components. In addition, the default matrices prepared here vary in kind as in the case of SPS quantization matrices. The default matrices are predetermined quantization matrices, and are not basically included in any of the SPS and the PPS.

When all the SPS quantization matrices are the same as the default matrices (Yes in S205), the SPS_QMatrix_PresentFlag is set to 0 (which indicates that the SPS does not include any SPS quantization matrix) (S206). When one or more of the SPS quantization matrices are not the same as the default matrices (No in S205), the SPS_QMatrix_PresentFlag is set to 1 (which indicates that the SPS includes the quantization matrices) (S207).

In addition, when the transform skip enable flag indicates 1 (which indicates that skipping of a transform process is allowed), a determination is made as to whether all the coefficients of the 4×4 SPS quantization matrix are 16, and the SPS quantization matrices other than the 4×4 SPS quantization matrix are the same as the default matrices other than the 4×4 default quantization matrix (S208).

When the determination result is true (Yes in S208), the SPS_QMatrix_PresentFlag is set to 0 (which indicates that the SPS does not include any SPS quantization matrix) (S209). When the determination result is false (No in S208), the SPS_QMatrix_PresentFlag is set to 1 (which indicates that the SPS includes the quantization matrices) (S210).

Next, the QMatrixFlag encoder 202, the SPS_QMatrix_PresentFlag encoder 204, and the matrix data encoder 220 respectively code the QMatrixFlag, SPS_QMatrix_PresentFlag, and the matrix data of the SPS quantization matrix, and output a coded bitstream (S211 to S215).

More specifically, the QMatrixFlag encoder 202 codes the QMatrixFlag (S211). When the QMatrixFlag indicates 1 (Yes in S212), the SPS_QMatrix_PresentFlag encoder 204 codes the QMatrix_PresentFlag (S213). Furthermore, when the QMatrix_PresentFlag indicates 1 (Yes in S214), the matrix data encoder 220 codes the matrix data of the SPS quantization matrices (S215).

In other words, the SPS_QMatrix_PresentFlag is coded only when the QMatrixFlag indicates 1 (which indicates that the SPS quantization matrices are used). The matrix data of the SPS quantization matrix is coded only when the QMatrixFlag indicates 1 (which indicates that the quantization matrices are used), and the SPS_QMatrix_PresentFlag indicates 1 (which indicates that the SPS includes the quantization matrices). Coding of matrix data is described in detail later. The coded bitstream output by the coding is included in the SPS.

[Operations (Coding of PPS Quantization Matrices)]

Next, a flow of coding PPS quantization matrices is described with reference to each of FIG. 5A and FIG. 5B. First, the PPS_QMatrix_PresentFlag setting unit 205 sets PPS_QMatrix_PresentFlag according to QMatrixFlag, SPS_QMatrix_PresentFlag, a transform skip enable flag, and PPS quantization matrices (S301 to S312).

The PPS_QMatrix_PresentFlag (PPS quantization matrix present flag) is a flag indicating whether or not to code the PPS quantization matrices. In other words, the PPS_QMatrix_PresentFlag shows whether or not the PPS includes the plurality of quantization matrices to be used in the quantization process or the inverse quantization process. The PPS_QMatrix_PresentFlag shows that the PPS quantization matrices are coded when the flag indicates 1, and shows that no PPS quantization matrix is coded when the flag indicates 0.

Figure 5A:
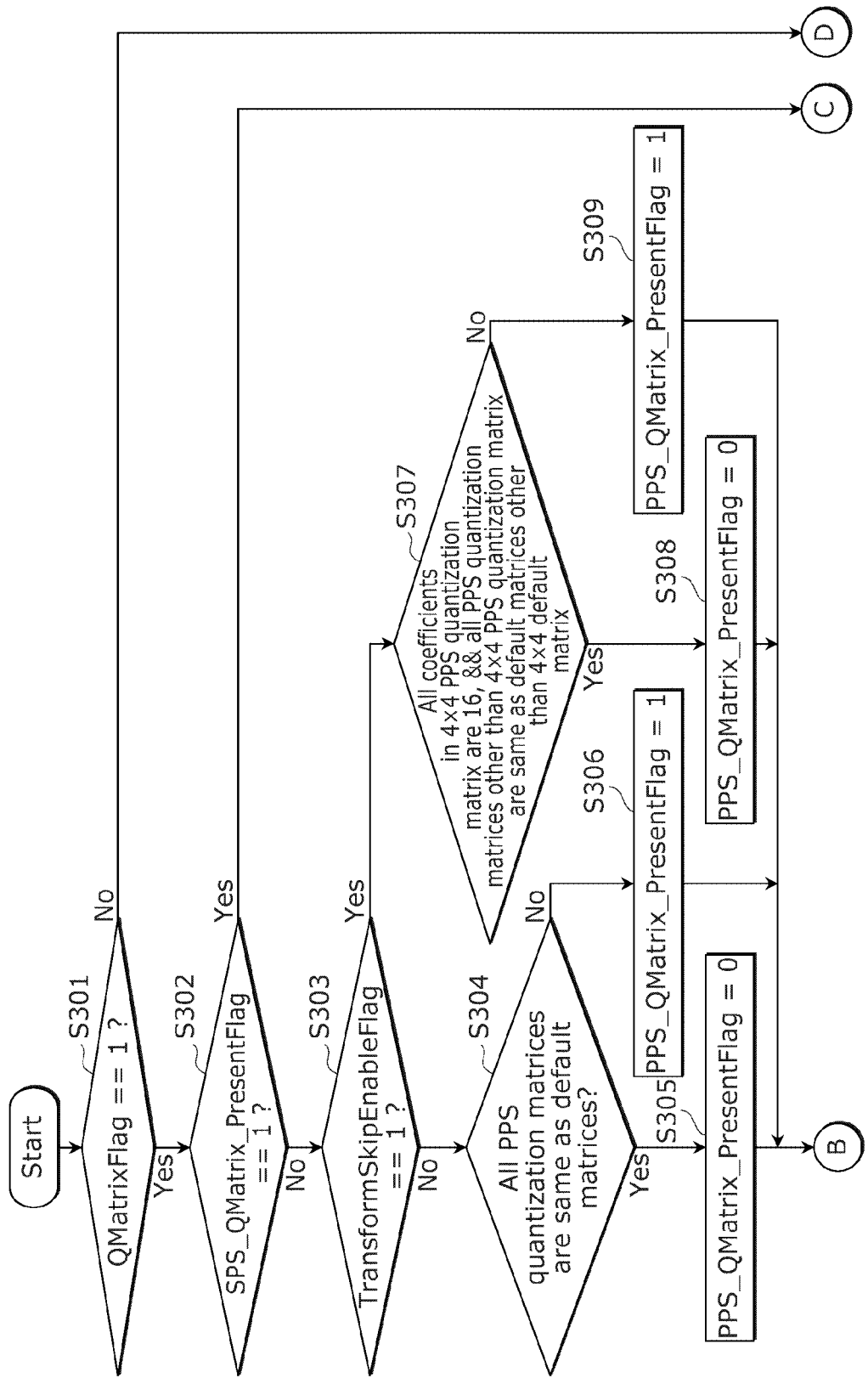
FIG. 5A is a diagram showing a flow of coding PPS quantization matrices according to Embodiment 1.
Figure 5B:
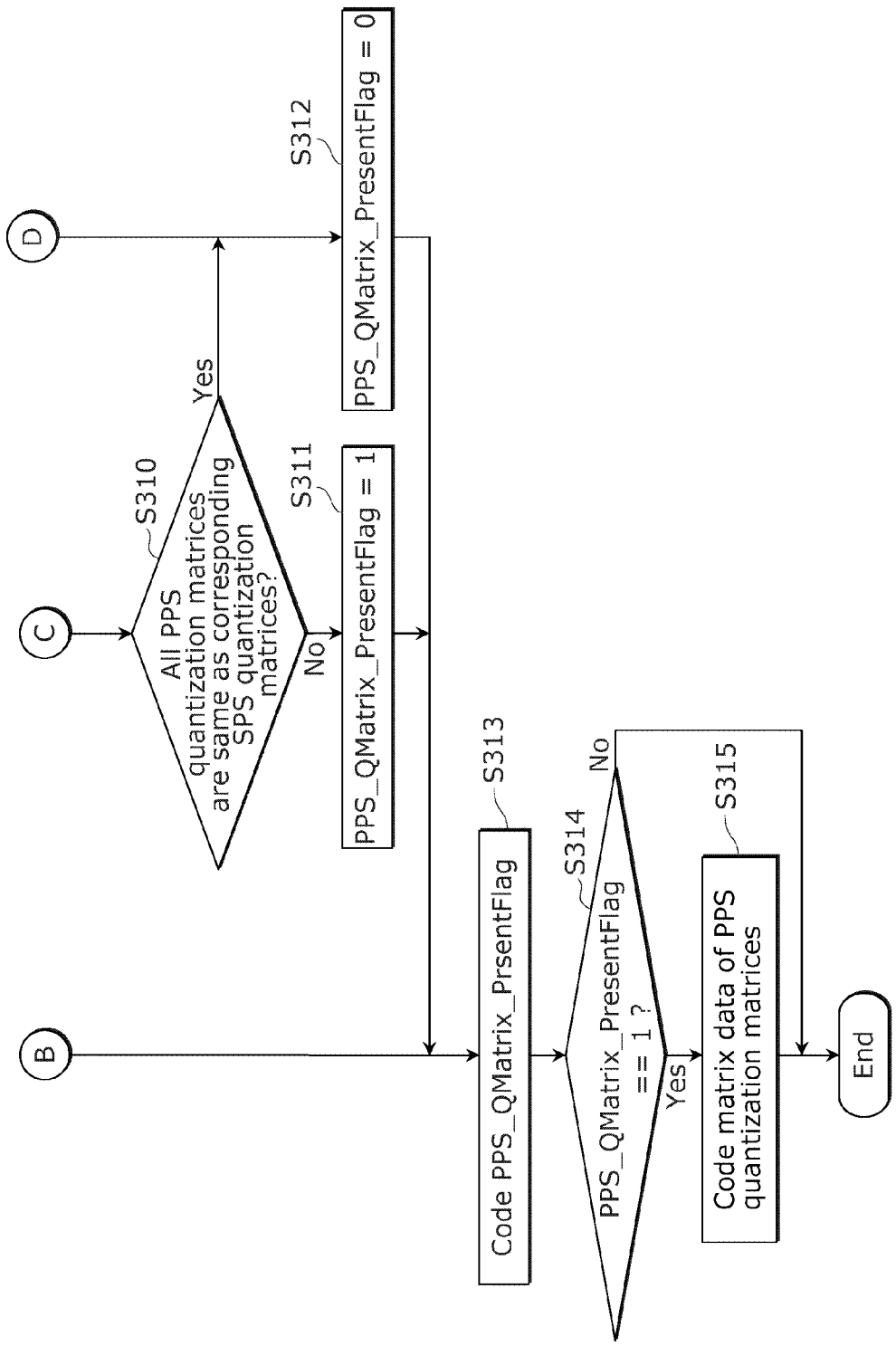
FIG. 5B is a diagram showing a flow (subsequent to the flow) of the coding of the PPS quantization matrices according to Embodiment 1.

In the coding flow in each of FIG. 5A and FIG. 5B, when the QMatrixFlag indicates 0 (which indicates that no quantization matrix is used) (No in S301), the PPS_QMatrix_PresentFlag is set to 0 (S312). When the QMatrixFlag indicates 1 (which indicates that the quantization matrices are used) (Yes in S301), the current process is succeeded by one of branch processes according to the SPS_QMatrix_PresentFlag (S302).

When the SPS_QMatrix_PresentFlag indicates 1 (which indicates that the SPS includes quantization matrices) (Yes in S302), a determination is made as to whether or not all the PPS quantization matrices are the same as the SPS quantization matrices (S310). It is to be noted that, as in the case of the SPS quantization matrices, the PPS quantization matrices prepared here vary in kind according to frequency transform sizes (matrix sizes) of 4×4 and 8×8, prediction modes such as intra-frame prediction modes and inter-frame prediction modes, and components such as luminance components and chrominance components.

When all the PPS quantization matrices are the same as the SPS quantization matrices (Yes in S310), the PPS_QMatrix_PresentFlag is set to 0 (which indicates that the PPS does not include any quantization matrix) (S312). When one or more of the PPS quantization matrices are not the same as the SPS quantization matrices (No in S310), the PPS_QMatrix_PresentFlag is set to 1 (which indicates that the PPS includes the quantization matrices) (S311).

In addition, when the SPS_QMatrix_PresentFlag indicates 0 (which indicates that the SPS does not include any quantization matrix (No in S302), whether or not the transform skip enable flag indicates 1 (which indicates that skipping of a transform process is allowed) is determined (S303).

When the transform skip enable flag indicates 0 (which indicates that skipping of a transform process is prohibited) (No in S303), a determination is made as to whether or not all the PPS quantization matrices are the same as the default matrices (S304). When all the PPS quantization matrices are the same as the default matrices (Yes in S304), the PPS_QMatrix_PresentFlag is set to 0 (which means that the PPS does not include any quantization matrix) (S305). When one or more of the PPS quantization matrices are not the same as the default matrices (No in S304), the PPS_QMatrix_PresentFlag is set to 1 (which indicates that the PPS includes the quantization matrices) (S306).

In addition, when the transform skip enable flag indicates 1 (which indicates that skipping of a transform process is allowed) (Yes in S303), a determination is made as to whether all the coefficients of the 4×4 PPS quantization matrix are 16, and the PPS quantization matrices other than the 4×4 SPS quantization matrix are the same as the default matrices other than the 4×4 default matrix (S307).

When the determination result is true (Yes in S307), the PPS_QMatrix_PresentFlag is set to 0 (which indicates that the PPS does not include any quantization matrix) (S308). When the determination result is false (No in S307), the PPS_QMatrix_PresentFlag is set to 1 (which indicates that the PPS includes the quantization matrices) (S309).

Next, the PPS_QMatrix_PresentFlag encoder 206 and the matrix data encoder 220 code the PPS_QMatrix_PresentFlag and the matrix data of the PPS quantization matrix, and output the coded bitstream (S313 to S315).

More specifically, the PPS_QMatrix_PresentFlag encoder 206 codes the PPS_QMatrix_PresentFlag (S313). When the PPS_QMatrix_PresentFlag indicates 1 (which indicates that the PPS includes the quantization matrices) (Yes in S314), the matrix data encoder 220 codes the matrix data of the PPS quantization matrices (S315).

In other words, the matrix data of the PPS quantization matrices is coded only when the PPS_QMatrix_PresentFlag indicates 1 (which indicates that the PPS includes the quantization matrices). Coding of the matrix data is described in detail later. The coded bitstream output by the coding is included in the PPS.

[Operations (Coding of Matrix Data)]

Figure 6A:
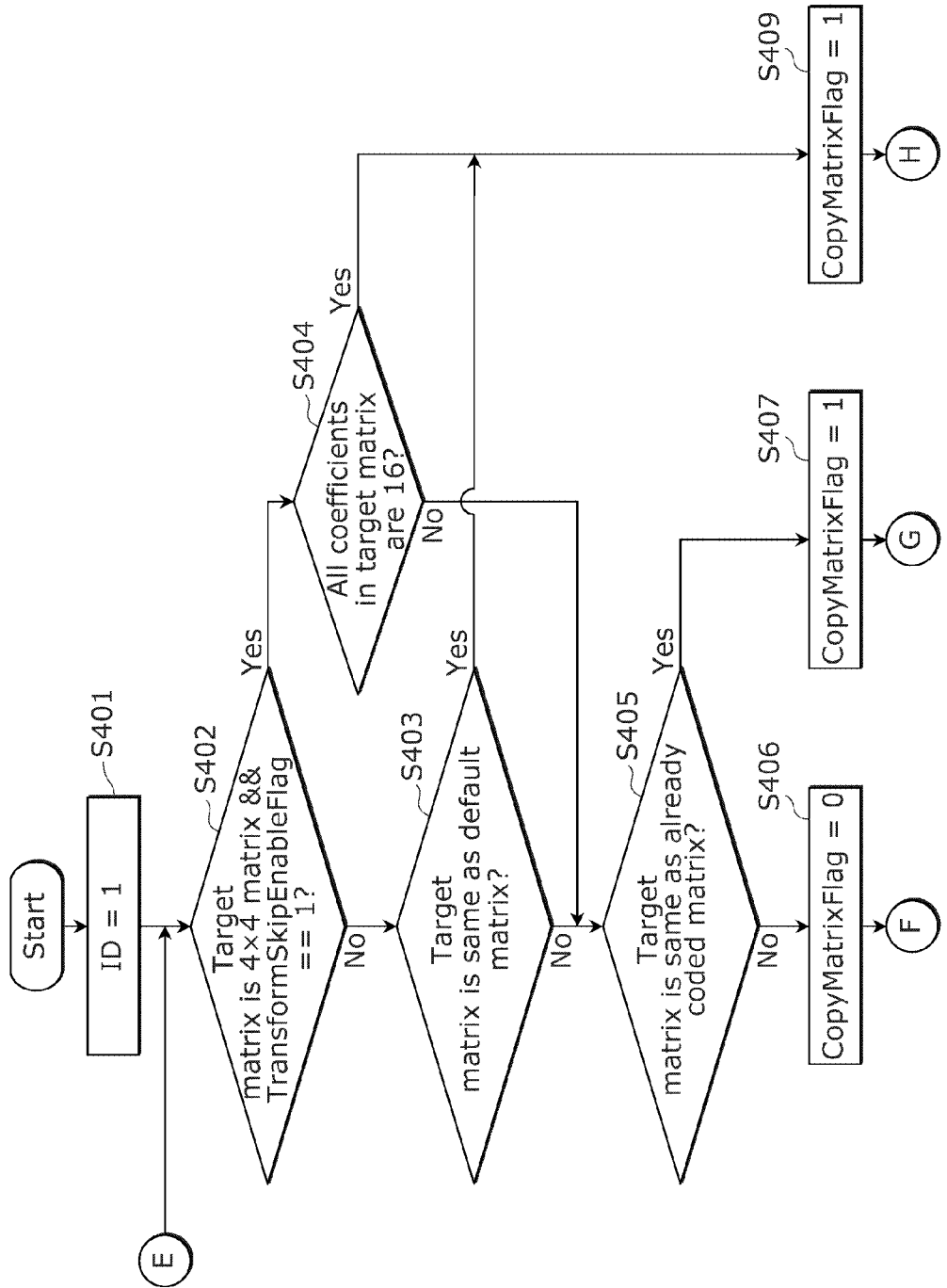
FIG. 6A is a diagram showing a flow of coding matrix data according to Embodiment 1.

Next, a flow of coding matrix data is described with reference to each of FIG. 6A and FIG. 6B. It is to be noted that the processes (S402 to S416) on the matrix data are performed on all the quantization matrices, and thus are repeated plural times corresponding to the number of quantization matrices.

As described earlier, the quantization matrices which vary in kind are prepared according to frequency transform sizes of 4×4 and 8×8 (matrix sizes), prediction modes such as intra-frame prediction modes and inter-frame prediction modes, pixel components such as luminance components and chrominance components. Step S401 in FIG. 6A and Step S415 in FIG. 6B are processes for assigning an ID to each quantization matrix. The ID is initialized in Step S401, and the ID is incremented by 1 in Step S415. The ID is assigned to the quantization matrix.

In coding of the matrix data, the CopyMatrixFlag setting unit 207 sets CopyMatrixFlag according to a target matrix and a transform skip enable flag. In addition, the CopyMatrixID setting unit 209 sets CopyMatrixID according to the target matrix and the transform skip enable flag (S402 to S410).

More specifically, all the coefficients in the target matrix are compared with 16 when the target matrix is a 4×4 matrix, and the transform skip enable flag indicates 1 (which indicates that skipping of a transform process is allowed) (Yes in S402). When the target matrix is not a 4×4 matrix, or the transform skip enable flag indicates 0 (which indicates that skipping of a transform process is prohibited) (No in S402), the target matrix is compared with the default matrix (S403).

When the comparison shows that the target matrix is the same as the default matrix (Yes in S404 or Yes in S403), the CopyMatrixFlag is set to 1 (which indicates that a copy matrix is used) (S409), and the CopyMatrixID is set to 0 (which is the ID of the default matrix) (S410). When the comparison shows that the target matrix is different from the default matrix (No in S404 or No in S403), the target matrix is further compared with an already coded matrix (which has an ID smaller than that of the target matrix) (S405).

When the comparison shows that the target matrix is the same as the already coded matrix (Yes in S405), the CopyMatrixFlag is set to 1 (which indicates that the copy matrix is used) (S407). The CopyMatrixID is set as the ID of the same matrix (S408). When there is no same matrix (No in S405), the CopyMatrixFlag is set to 0 (which indicates that no copy matrix is used) (S406).

Next, the CopyMatrixFlag encoder 208, the CopyMatrixID encoder 210, and the matrix coefficient encoder 211 respectively code the CopyMatrixFlag, the CopyMatrixID, and the matrix coefficients (S411 to S414).

More specifically, the CopyMatrixFlag encoder 208 codes the CopyMatrixFlag (S411). When the CopyMatrixFlag indicates 1 (which indicates that the copy matrix is used) (Yes in S412), the CopyMatrixID encoder 210 codes the CopyMatrixID (S414). When the CopyMatrixFlag indicates 0 (which indicates that no copy matrix is used) (No in S412), the matrix coefficient encoder 211 codes the matrix coefficients (S413).

In other words, the CopyMatrixID (which is the ID of the copy matrix to be used) is coded only when the CopyMatrixFlag indicates 1 (which indicates that the copy matrix is used). The matrix coefficients are coded only when the CopyMatrixFlag indicates 0 (which indicates that no copy matrix is used). It is to be noted that a 4×4 matrix has 16 coefficients, and an 8×8 matrix has 64 coefficients.

Advantageous Effects

As described above, the image coding apparatus in this embodiment can use the default matrices, only requiring a small amount of codes, and thus can increase the coding efficiency.

More specifically, when the default matrices are used as all the quantization matrices, the QMatrixFlag is set to 1 (which indicates that the quantization matrices are used), the SPS_QMatrix_PresentFlag is set to 0 (which indicates that the SPS does not include any quantization matrix), and the PPS_QMatrix_PresentFlag is set to 0 (which indicates that the PPS does not include any quantization matrix). In this way, these three flags are used to present that the default matrices are used as all the quantization matrices.

In addition, it is possible to adaptively switch conditions for skipping coding of quantization matrices by changing the settings of the SPS_QMatrix_PresentFlag and the PPS_QMatrix_PresentFlag and the CopyMatrixFlag according to the transform skip enable flag.

When the transform skip enable flag indicates 1 (which indicates that skipping of a transform process is allowed), it is highly likely that a high quality image is obtained when no quantization matrix is rather used. For example, since no frequency transform process is performed when a transform process is skipped, quantization is performed on a difference block instead of frequency coefficients. In this case, the image coding apparatus can naturally quantize a block using the same coefficients for the entire block instead of using any quantization matrix.

Accordingly, when skipping of a transform process is allowed, the quantization matrix setting unit 101 may set the same value to all the matrix coefficients. Accordingly, the image coding apparatus can reduce the amount of codes required to code quantization matrices by switching coding conditions based on the transform skip enable flag. In addition, the image decoding apparatus can reconstruct the matrix coefficients using the transform skip enable flag according to the same rule. Accordingly, the amount of codes is reduced.

In the above example, the settings of the SPS_QMatrix_PresentFlag and the PPS_QMatrix_PresentFlag and the CopyMatrixFlag are switched according to the transform skip enable flag. However, there is no need to always perform such switching using the transform skip enable flag. It is also good to set the SPS_QMatrix_PresentFlag and the PPS_QMatrix_PresentFlag and the CopyMatrixFlag using only the values of the SPS quantization matrices and the PPS quantization matrices.

For example, in the flow of coding the SPS quantization matrices (FIG. 4A and FIG. 4B), Steps S205 to S207 and Steps S208 to S210 are switched according to the transform skip enable flag. Alternatively, it is also good to set the SPS_QMatrix_PresentFlag in only Steps S205 to S207 without depending on any transform skip enable flag.

In addition, in the above example, the PPS_QMatrix_PresentFlag is always coded for each picture. However, when no quantization matrix is used (when the QMatrixFlag indicates 0), there is no need to always code the PPS_QMatrix_PresentFlag.

In addition, in the above example, the QMatrixFlag (this flag indicates whether or not to use quantization matrices) is coded in the coding process of the SPS quantization matrices). However, the QMatrixFlag may be coded in the coding process of the PPS quantization matrices. In this case, the SPS_QMatrix_PresentFlag is coded without depending on the value of QMatrixFlag.

In addition, in the example, the quantization matrices are input from outside. However, quantization matrices may be determined according to features of an input image. In addition, the quantization matrices may be selected from plural kinds of quantization matrices. Alternatively, fixed quantization matrices may be used.

In addition, in the above example, the transform skip enable flag is input from outside. However, a transform skip enable flag may be input according to features of an input image. Alternatively, the transform skip enable flag may have a fixed value.

In the above example, the matrix data encoder 220 realizes a mechanism for using a copy of an already coded matrix based on the CopyMatrixFlag and the CopyMatrixID. However, this is a non-limiting example. Alternatively, the matrix coefficient encoder 211 may always code matrix data instead of using a copy matrix.

It is to be noted that a transform process is skipped only when the transform size is 4×4 in the above example. A transform process is always performed on the matrices other than the 4×4 matrix. However, this is a non-limiting example. Alternatively, a transform process is skipped when the transform size is 8×8 or smaller, or is skipped for all the transform sizes.

In this case, not only the coefficients in the 4×4 quantization matrix but also the coefficients in each of the other quantization matrices are compared with 16.

In addition, in the above example, when the transform skip enable flag indicates 1 (which indicates that skipping of a transform process is allowed), whether or not all the coefficients of the 4×4 quantization matrix are 16 is determined. Alternatively, it is also good to determine whether or not all the coefficients of the 4×4 quantization matrix are the same in numerical value using a numerical value other than 16.

In the above example, the block sizes are determined to be 64×64 at the maximum, and 8×8 at the minimum. However, the block sizes may be larger or smaller. Alternatively, the blocks may have fixed sizes. In addition, transform sizes are not limited to the ones in the above example.

Figure 7:
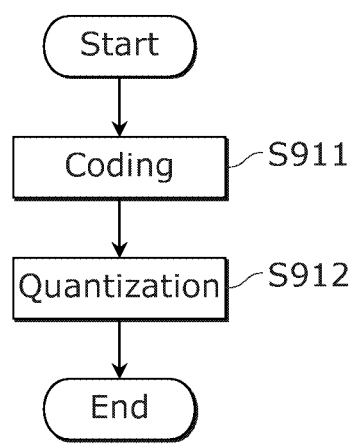
FIG. 7 is a diagram showing a unique operation flow according to Embodiment 1.

FIG. 7 shows unique operations performed by the image coding apparatus according to the above example. The above example is explained below.

The quantization matrix encoder 102 codes the first flag, the second flag, and the third flag (S911). The first flag shows whether or not the plurality of quantization matrices each having coefficients different for different frequencies are (selectively) used in a quantization process. The second flag shows whether or not the plurality of quantization matrices are included in the SPS. The second flag shows whether or not the plurality of quantization matrices are included in the PPS. The quantizing unit 106 performs the quantization process (S912).

When the plurality of default matrices are used in the quantization process as the plurality of quantization matrices, the quantization matrix encoder 102 codes the first flag indicating that the plurality of quantization matrices are used. In this case, the quantization matrix encoder 102 codes the second flag indicating that the plurality of quantization matrices are not included in the SPS, and the third flag indicating that the plurality of quantization matrices are not included in the PPS.

In this way, these three flags control use or unuse of the plurality of default matrices. Accordingly, it is possible to increase the coding efficiency. In addition, the fact that the SPS and the PPS do not include any quantization matrix shows use of the plurality of default matrices. Accordingly, error resistance is increased.

It is to be noted that to code the first flag indicating that the plurality of quantization matrices are used in a quantization process means to code, as the value of the first flag, a value indicating that the plurality of quantization matrices are used in the quantization process. This relationship is the same in the coding of the other flags.

In addition, the other processes may be executed by other apparatuses. The image coding apparatus does not include structural elements for the other processes. Alternatively, the image coding apparatus may arbitrarily perform operations corresponding to the above example.

For example, the image coding apparatus codes the first flag indicating unuse of the plurality of quantization matrices in a quantization process, when using the plurality of flat matrices each having the same coefficients in the quantization process instead of the plurality of quantization matrices.

In addition, for example, the image coding apparatus codes the first flag indicating use of the plurality of quantization matrices in a quantization process, when using the plurality of quantization matrices in the quantization process. In this case, the image coding apparatus codes the second flag indicating that the plurality of quantization matrices are included in the SPS, or the third flag indicating that the plurality of quantization matrices are included in the PPS.

In addition, the image coding apparatus includes the plurality of quantization matrices in the SPS, when coding the second flag indicating that the plurality of quantization matrices are to be included in the SPS. In addition, the image coding apparatus includes the plurality of quantization matrices in the PPS, when coding the third flag indicating that the plurality of quantization matrices are to be included in the PPS.

In addition, for example, when the first quantization matrix is equal to the second quantization matrix, the image coding apparatus includes, in the parameter set, the identifier indicating the second quantization matrix as the copy identifier indicating the matrix whose copy is used as the first quantization matrix. In addition, when the first quantization matrix is equal to the default matrix, the image coding apparatus includes, in the parameter set, the identifier indicating the default matrix as the copy identifier.

In addition, for example, the image coding apparatus sets sequence quantization matrices for the sequence and picture quantization matrices for the picture. In addition, for example, the image coding apparatus codes the first flag indicating use of the plurality of quantization matrices in a quantization process, when using the picture quantization matrices in the quantization process for the picture.

In addition, when the default matrices are set as the sequence quantization matrices, the image coding apparatus codes the second flag indicating that no quantization matrix is included in the SPS. In addition, when the sequence quantization matrices are set as the picture quantization matrices, the image coding apparatus codes the third flag indicating that no quantization matrix is included in the PPS.

In addition, for example, the image coding apparatus generates quantized data by performing a quantization process, and codes the resulting quantized data.

In addition, for example, the image coding apparatus uses the flat matrix having the same coefficients in a quantization process for a block not subject to frequency transform and uses the plurality of default matrices subject to frequency transform.

In this case, the image coding apparatus codes the first flag indicating the use of the plurality of quantization matrices in the quantization process. In addition, the image coding apparatus codes the second flag indicating that no quantization matrix is included in the SPS. In addition, the image coding apparatus codes the third flag indicating that no quantization matrix is included in the PPS.

The above operations may be arbitrarily combined. In addition, various modifications may be added based on the above example in this embodiment.

Furthermore, the processes in this embodiment may be performed by software. This software may be distributed by downloading or the like. In addition, this software may be recorded on a recording medium such as CD-ROMs and be distributed. These applications are possible in other embodiments.

[Embodiment 2]

This embodiment describes an image decoding apparatus corresponding to the image coding apparatus described in Embodiment 1. The image decoding apparatus in this embodiment performs operations corresponding to operations performed by the image coding apparatus in Embodiment 1. In this way, the image decoding apparatus in this embodiment can decode an image coded by the image coding apparatus in Embodiment 1. Here, this embodiment may not include the same descriptions provided using the same terms in Embodiment 1.

[Overall Structure]

Figure 8:
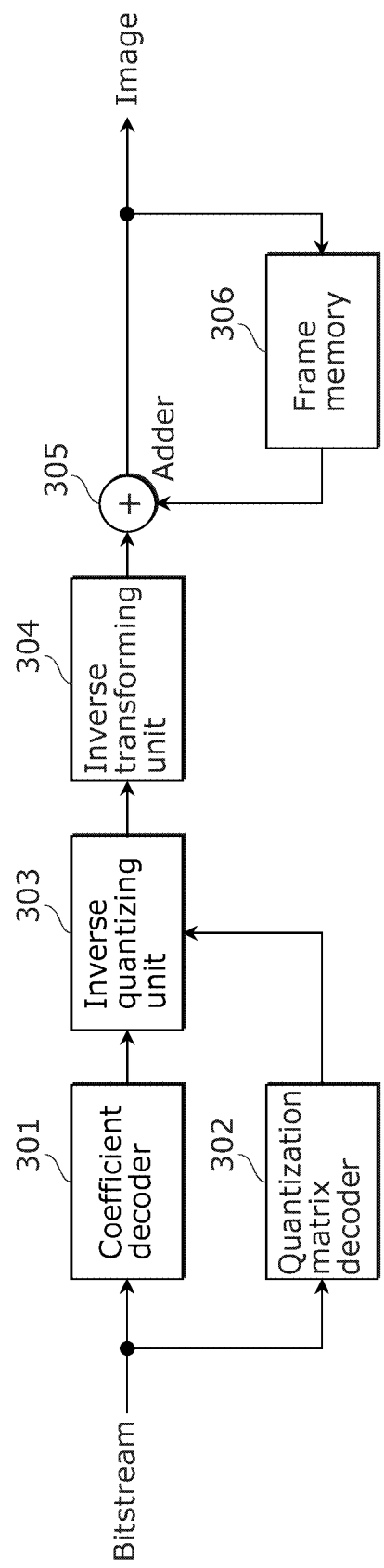
FIG. 8 is a diagram showing a structure of an image decoding apparatus according to Embodiment 2.

FIG. 8 shows a structure of an image decoding apparatus in this embodiment. As shown in FIG. 8, the image decoding apparatus in this embodiment includes a coefficient decoder 301, a quantization matrix decoder 302, an inverse quantizing unit 303, an inverse transforming unit 304, an adder 305, and a frame memory 306.

[(Overall) Operations]

Figure 9:
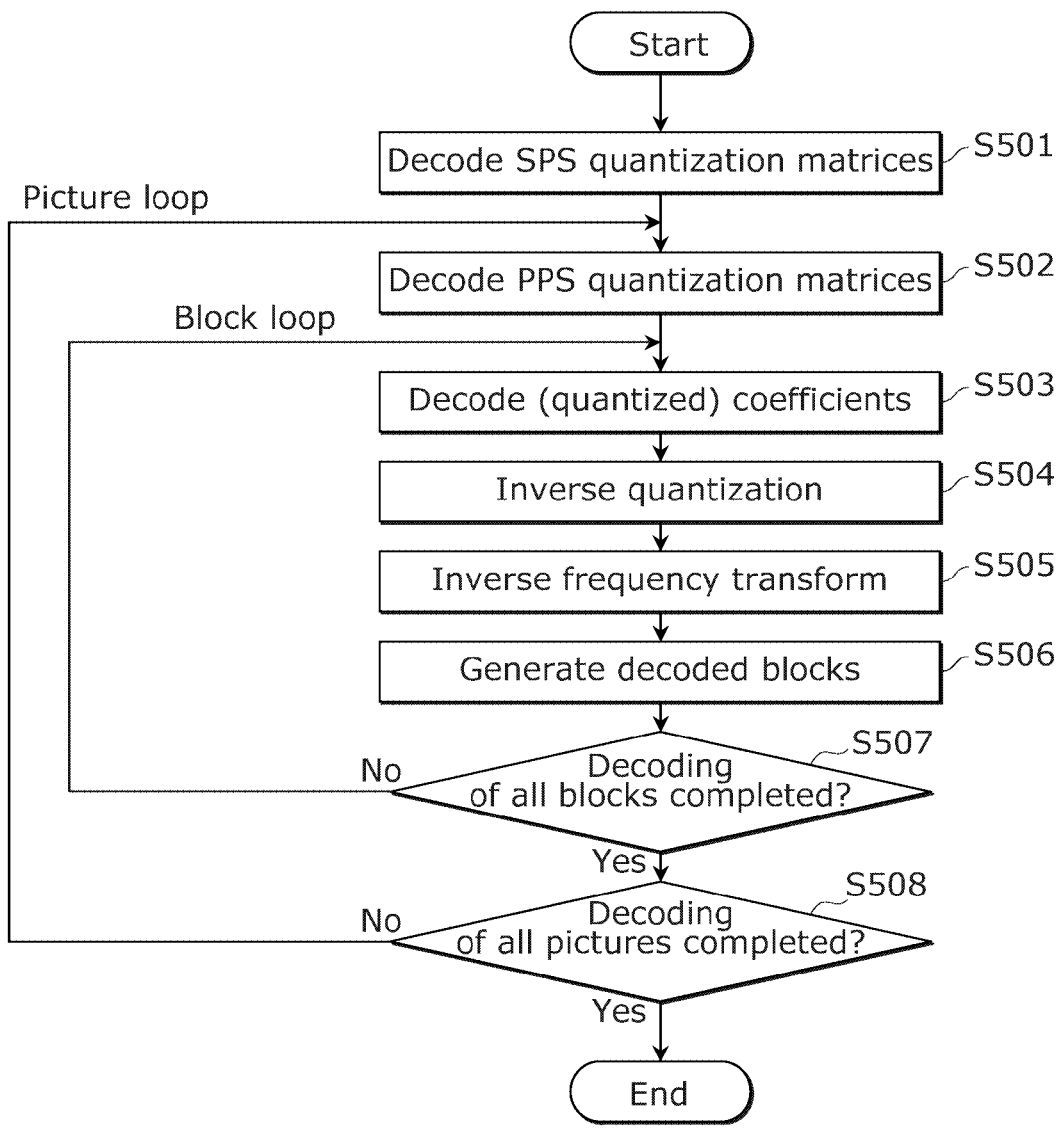
FIG. 9 is a diagram showing a flow of overall decoding according to Embodiment 2.

Next, a flow of overall decoding is described with reference to FIG. 9. First, the quantization matrix decoder 302 decodes SPS quantization matrices which are quantization matrices to be used in a processing target sequence (S501). The details are described later. It is to be noted that subsequent processes (S502 to S508) for a picture is performed for each of pictures in a sequence. Thus, these processes are repeated plural times corresponding to the number of pictures in the sequence.

Next, the quantization matrix decoder 302 sets PPS quantization matrices which are quantization matrices to be used for a target picture (S502). The details are described later. It is to be noted that subsequent processes (S503 to S507) for a block are performed for each of blocks in a picture. Thus, these processes are repeated plural times corresponding to the number of blocks in the picture.

Next, the coefficient decoder 301 decodes the quantized coefficients from the coded bitstream (S503). The inverse quantizing unit 303 inverse-quantizes the quantized coefficients to reconstruct the frequency coefficients or the difference block (S504). At this time, the inverse quantization is performed using the PPS quantization matrices decoded in Step S502.

Next, the inverse transforming unit 304 transforms the frequency coefficients into pixel data to reconstruct the difference block (S505). At this time, a flag indicating whether or not a frequency transform process for a target block is skipped was obtained from the coded bitstream. When the frequency transform process was skipped, an inverse transform process is also skipped. It is to be noted that a transform process is skipped only when the transform size is 4×4, and that a transform process is performed without depending on any flag when the transform size is the sizes other than 4×4.

Next, the adder 305 generates a decoded block by adding a decoded image (a prediction image) stored in the frame memory 306 and the difference block, and newly stores the decoded block in the frame memory 306 (S506). The block (coding unit) has a variable size. For example, the minimum size is 8×8 in horizontal and vertical directions, and the maximum block size is 64×64 in horizontal and vertical directions.

Hereinafter, the quantization matrix decoder 302 is described in detail. The quantization matrix decoder 302 decodes the SPS quantization matrices and the PPS quantization matrices.

[Structure of Quantization Matrix Decoder]

Figure 10:
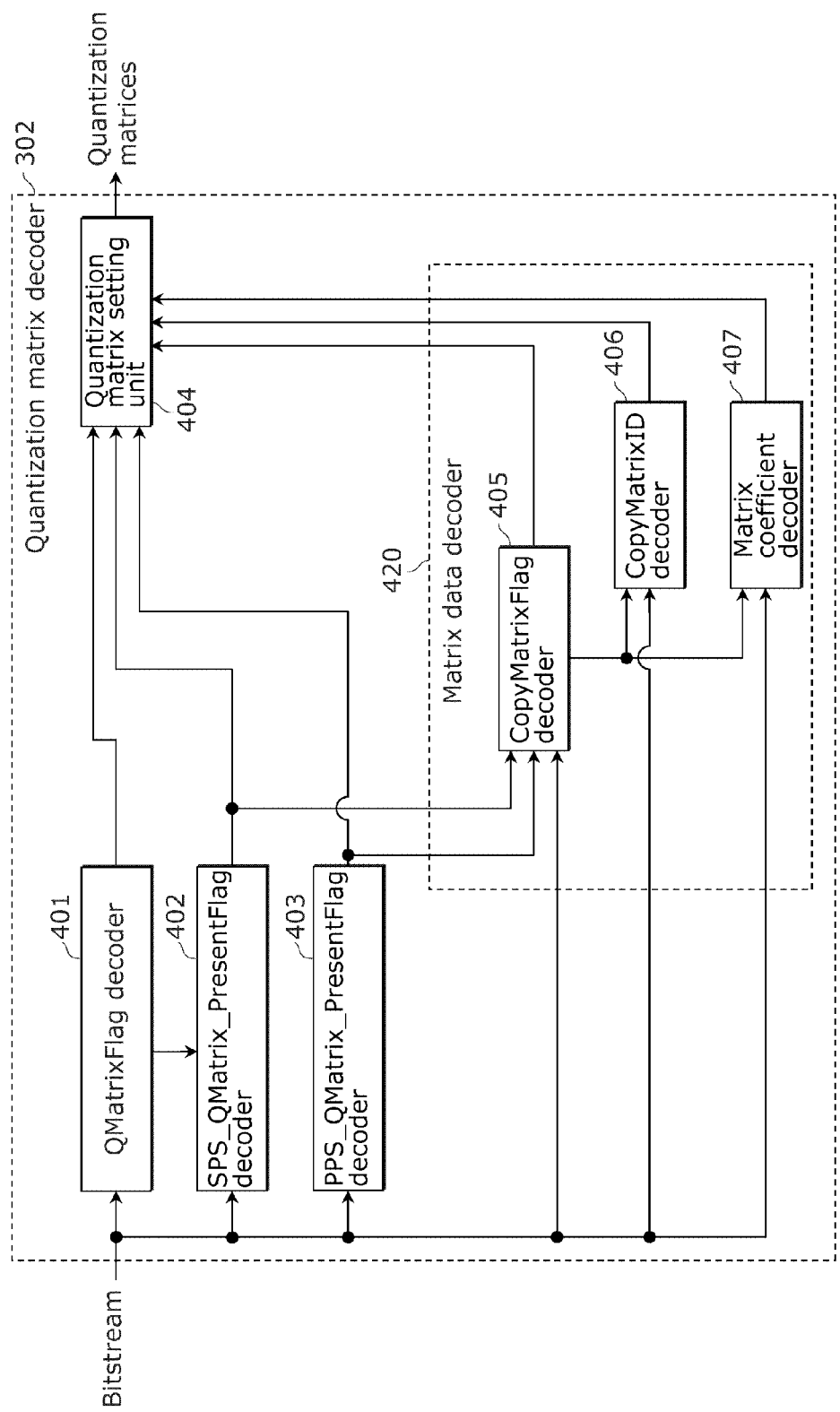
FIG. 10 is a diagram showing an internal structure of a quantization matrix decoder according to Embodiment 2.

FIG. 10 shows an internal structure of the quantization matrix decoder 302. As shown in FIG. 10, the quantization matrix decoder 302 includes a QMatrixFlag decoder 401, an SPS_QMatrix_PresentFlag decoder 402, a PPS_QMatrix_PresentFlag decoder 403, and a quantization matrix setting unit 404, and a matrix data decoder 420.

The matrix data decoder 420 includes a CopyMatrixFlag decoder 405, a CopyMatrixID decoder 406, and a matrix coefficient decoder 407.

[Operations (Decoding of SPS Quantization Matrices)]

Figure 11:
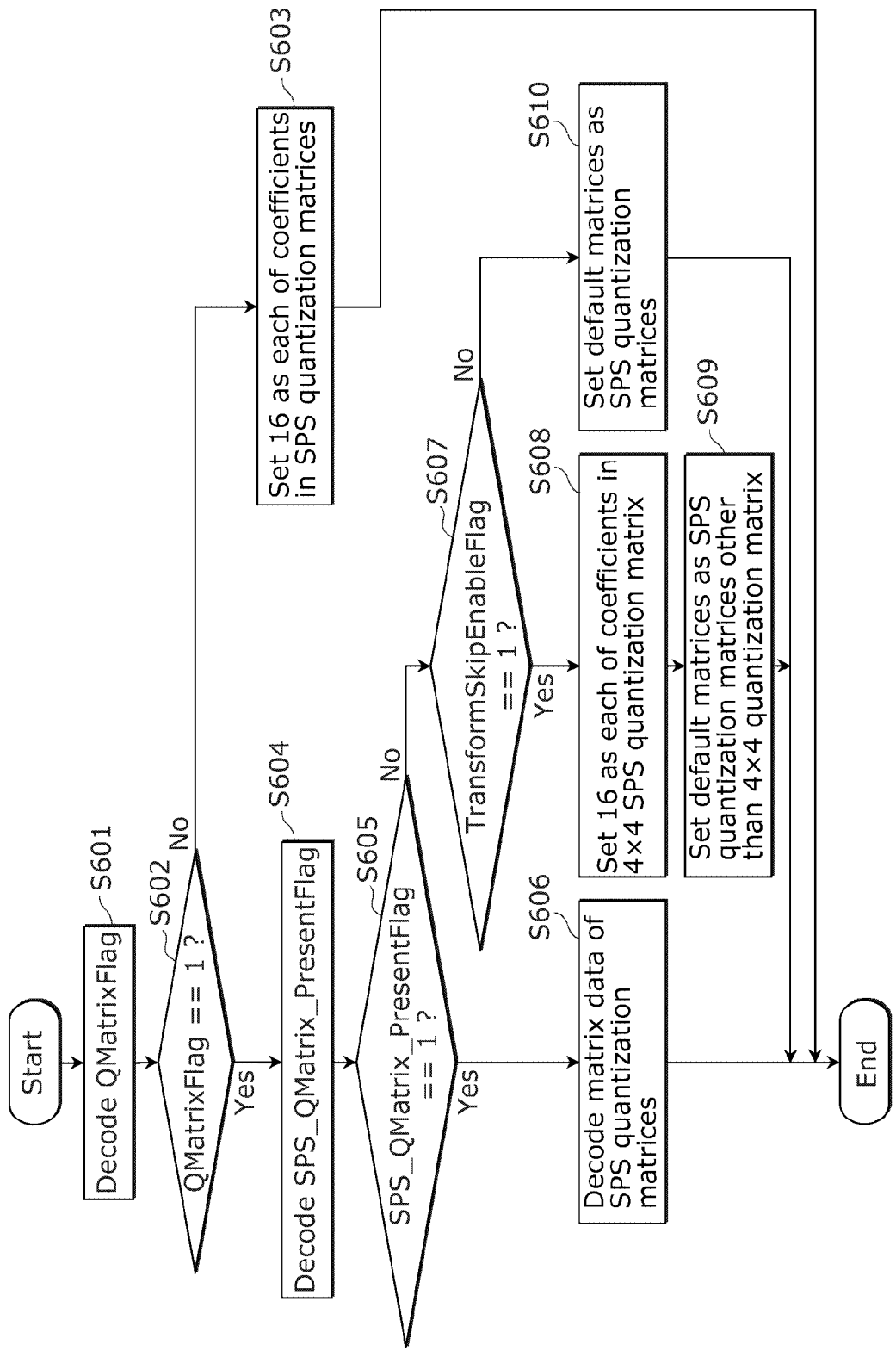
FIG. 11 is a diagram showing a flow of decoding SPS quantization matrices according to Embodiment 2.

Next, a flow of decoding SPS quantization matrices is described with reference to FIG. 11.

First, the QMatrixFlag decoder 401 decodes QMatrixFlag from the coded bitstream (S601). In addition, when the QMatrixFlag indicates 0 (which indicates that no quantization matrix is used) (No in S602), the quantization matrix setting unit 404 sets 16 as each of the coefficients of the SPS quantization matrices (S603). When the QMatrixFlag indicates 1 (which indicates that quantization matrices are used) (Yes in S602), the following steps S604 to S610 are performed.

More specifically, the SPS_QMatrix_PresentFlag decoder 402 decodes the SPS_QMatrix_PresentFlag from the coded bitstream (S604). When the SPS_QMatrix_PresentFlag indicates 1 (which indicates that quantization matrices are included in the SPS) (Yes in S605), the matrix data decoder 420 decodes the matrix data of the SPS quantization matrices (S606). Decoding of the matrix data is described in detail later.

When the SPS_QMatrix_PresentFlag indicates 0 (which indicates that no quantization matrix is included in the SPS) (No in S605), the quantization matrix setting unit 404 sets the SPS quantization matrices according to a transform skip enable flag in the coded bitstream (S607 to S610).

More specifically, when the transform skip enable flag indicates 0 (which indicates that skipping of a transform process is prohibited) (No in S607), default matrices are set as SPS quantization matrices (S610). In other words, the coefficients of the default matrices are copied and used as the coefficients of the SPS quantization matrices.

When the transform skip enable flag indicates 1 (which indicates that skipping of a transform process is allowed) (Yes in S607), set 16 as all the coefficients of the 4×4 SPS quantization matrix (S608), and set default matrices as SPS quantization matrices other than the 4×4 SPS quantization matrix (S609).

[Operations (Decoding of PPS Quantization Matrices)]

Figure 12:
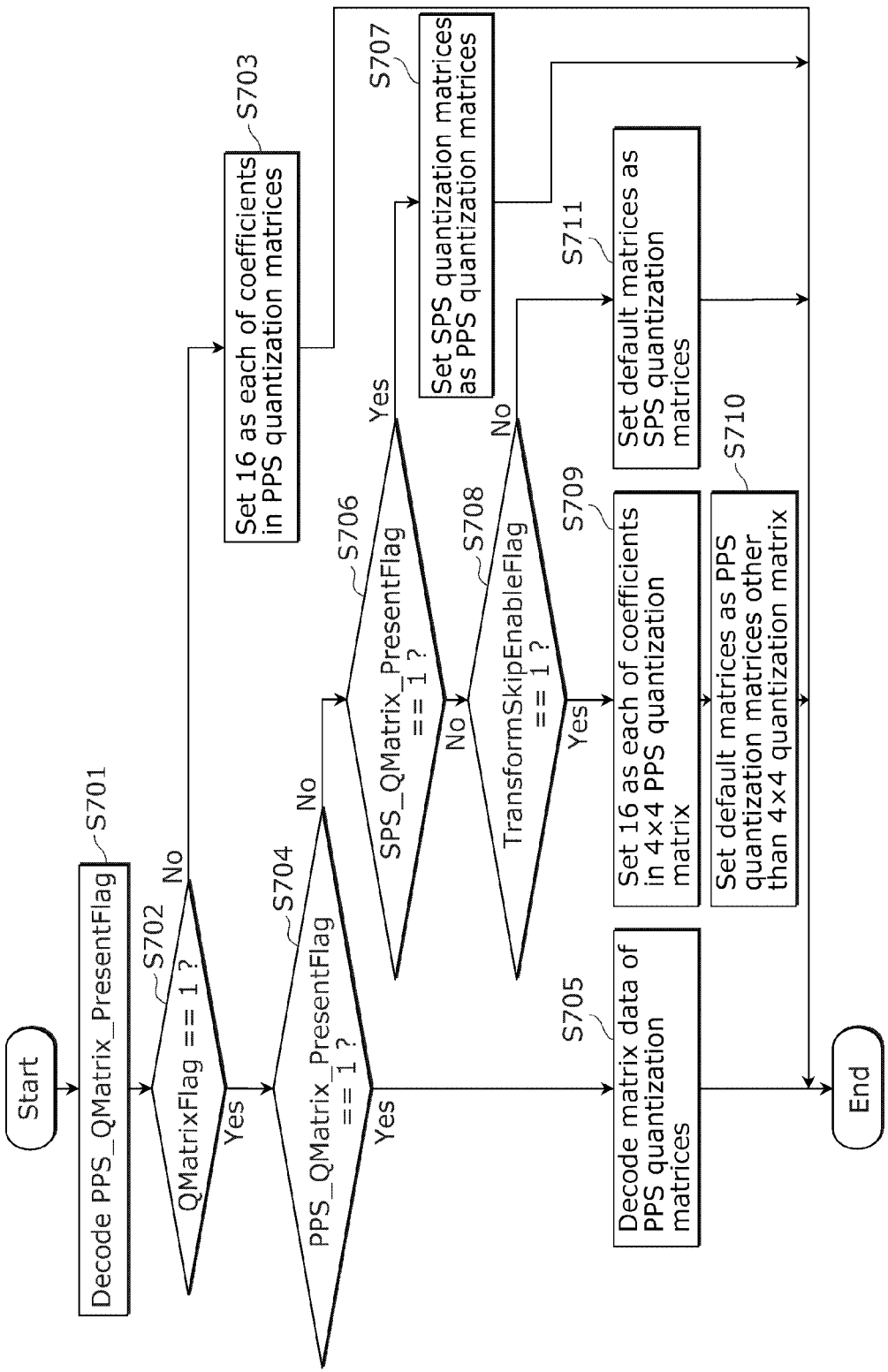
FIG. 12 is a diagram showing a flow of decoding PPS quantization matrices according to Embodiment 2.

Next, a flow of decoding PPS quantization matrices is described with reference to FIG. 12. First, the PPS_QMatrix_PresentFlag decoder 403 decodes the PPS_QMatrix_PresentFlag from the coded bitstream (S701).

Next, when the QMatrixFlag decoded by the QMatrixFlag decoder 401 indicates 0 (which indicates that no quantization matrix is used) (No in S702), the quantization matrix setting unit 404 sets 16 as each of the coefficients of the PPS quantization matrices (S703). When the QMatrixFlag indicates 1 (which indicates that quantization matrices are used) (Yes in S702), the following steps S704 to S711 are performed.

More specifically, when the PPS_QMatrix_PresentFlag indicates 1 (which indicates that quantization matrices are included in the PPS) (Yes in S704), the matrix data decoder 420 decodes the matrix data of the PPS quantization matrices (S705). Decoding of the matrix data is described in detail later. When the PPS_QMatrix_PresentFlag indicates 0 (which indicates that no quantization matrix is included in the PPS), the subsequent steps S706 to S711 are performed.

More specifically, when the SPS_QMatrix_PresentFlag indicates 1 (which indicates that quantization matrices are included in the SPS) (Yes in S706), the quantization matrix setting unit 404 sets SPS quantization matrices as the PPS quantization matrices (S707). In other words, the coefficients of the SPS quantization matrices are copied and used as the coefficients of the PPS quantization matrices.

When the SPS_QMatrix_PresentFlag indicates 0 (which indicates that no quantization matrix is included in the SPS) (No in S706), the quantization matrix setting unit 404 sets the PPS quantization matrix according to a transform skip enable flag in the coded bitstream (S708 to S711).

More specifically, when the transform skip enable flag indicates 0 (which indicates that skipping of a transform process is prohibited) (No in S708), default matrices are set as PPS quantization matrices (S711). In other words, the coefficients of the default matrices are copied and used as the coefficients of the PPS quantization matrices. When the transform skip enable flag indicates 1 (which indicates that skipping of a transform process is allowed) (Yes in S708), set 16 as all the coefficients of the 4×4 PPS quantization matrix (S709), and set corresponding ones of default matrices as PPS quantization matrices other than the 4×4 PPS quantization matrix (S710).

[Operations (Decoding of Matrix Data)]

Figure 13:
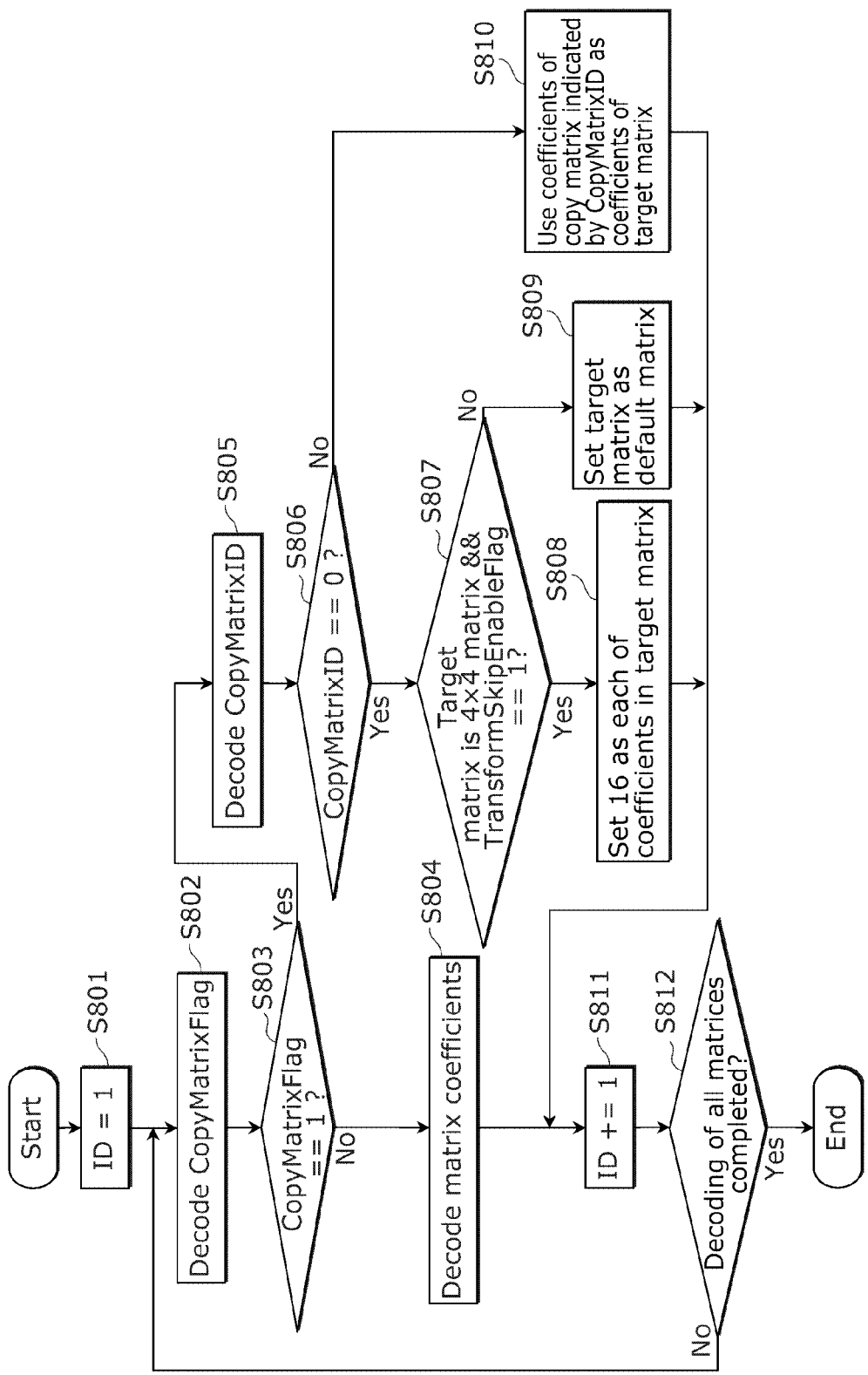
FIG. 13 is a diagram showing a flow of decoding matrix data according to Embodiment 2.

Next, a flow of overall decoding is described with reference to FIG. 13. It is to be noted that the processes (S802 to S812) on the matrix data are performed on all the quantization matrices. Accordingly, these processes are repeated plural times corresponding to the number of quantization matrices. As described earlier, several kinds of quantization matrices are prepared according to frequency transform sizes of, for example, 4×4 and 8×8 (matrix sizes), prediction modes such as intra-frame prediction modes and inter-frame prediction modes, and pixel components such as luminance components and chrominance components.

Step S801 and Step S811 are processes for assigning an ID to each quantization matrix. The ID is initialized in Step S801, and the ID is incremented by 1 in Step S811. The ID is assigned to the quantization matrix.

In the decoding of the matrix data, the CopyMatrixFlag decoder 405 decodes the CopyMatrixFlag first (S802). When the CopyMatrixFlag indicates 0 (which indicates that no copy matrix is used) (No in S803), the matrix coefficient decoder 407 decodes the matrix coefficients (S804). Here, a 4×4 matrix has 16 coefficients, and an 8×8 matrix has 64 coefficients.

When the QMatrixFlag indicates 1 (which indicates that a copy matrix is used) (Yes in S803), the following steps S805 to S810 are performed.

More specifically, the CopyMatrixID decoder 406 decodes the CopyMatrixID (S805). When the CopyMatrixID is a numerical value other than 0 (which is the ID of an already decoded matrix) (No on S806), the quantization matrix setting unit 404 uses the coefficients of the copy matrix indicated by the CopyMatrixID as the coefficients of the target matrix (S810).

When the CopyMatrixID indicates 0 (which is the ID of the default matrix) (Yes in S806), the quantization matrix setting unit 404 sets the value of the matrix according to the transform skip enable flag in the coded bitstream and the size of the target matrix (S807 to S809).

More specifically, 16 is set as all the coefficients in the target matrix when the transform skip enable flag indicates 1 (which indicates that skipping of a transform process is allowed) and the target matrix is a 4×4 matrix (Yes in S807). When the transform skip enable flag indicates 0 (which indicates that skipping of a transform process is prohibited), or when the target matrix is not the 4×4 matrix (No in S807), the target matrix is set as the corresponding default matrix (S809). In other words, the coefficients of the default matrix are copied and used as the coefficients of the target matrix.

Advantageous Effects

As described above, the image decoding apparatus in this embodiment can use the default matrices with a small amount of codes, and thus is capable of decoding the coded bitstream having an increased coding efficiency.

More specifically, the default matrices are used as all the quantization matrices, when the QMatrixFlag indicates 1 (which indicates that quantization matrices are used), the SPS_QMatrix_PresentFlag indicates 0 (which indicates that the SPS does not include any quantization matrix), and the PPS_QMatrix_PresentFlag indicates 0 (which indicates that the PPS does not include any quantization matrix). The image decoding apparatus can use the default matrices as all the quantization matrices, according to the three flags.

In addition, all the coefficients are set to the same value instead of using the default matrices, according to the transform skip enable flag. In this way, a high image quality is realized.

When the transform skip enable flag indicates 1 (which indicates that skipping of a transform process is allowed), it is highly likely that a high quality image is obtained when no quantization matrix is rather used. For example, since no frequency transform (inverse frequency transform) is performed when a transform process is skipped, quantization (inverse quantization) is performed on a difference block instead of frequency coefficients. In this way, the block is quantized (inverse-quantized) more naturally when the whole block is quantized (inverse-quantized) using the same coefficients, rather than using the quantization matrices.

For this reason, the quantization matrices are not always used when the transform skip enable flag indicates 1 (which indicates that skipping of a transform process is allowed). Accordingly, when the transform skip enable flag indicates 1 and the SPS and the PPS do not include any quantization matrix, all the coefficients of the current matrix are set to the same value instead of using the default matrices, which makes it possible to reduce the amount of codes and increase the image quality.

In this example, a setting value for the quantization matrix is selected according to the transform skip enable flag. However, the setting value does not always need to be selected according to the transform skip enable flag. The default matrices may be used without depending on the transform skip enable flag, when the QMatrixFlag indicates 1 (which indicates that quantization matrices are used) and the SPS_QMatrix_PresentFlag and the PPS_QMatrix_PresentFlag indicate 0 (which indicate that the SPS_QMatrix_PresentFlag and the PPS_QMatrix_PresentFlag do not include any quantization matrix).

For example, in the flow of decoding using the SPS quantization matrices (FIG. 12), Steps of S709 and S710 and Step S711 are switched according to the transform skip enable flag. However, the PPS quantization matrices may be set by performing only Step S711 without switching the steps.

In addition, in the above example, the PPS_QMatrix_PresentFlag is always decoded for each picture. However, when no quantization matrix is used (when the QMatrixFlag indicates 0), there is no need to always decode the PPS_QMatrix_PresentFlag.

In addition, in the above example, the QMatrixFlag (this flag indicating whether or not to use the quantization matrices) is encoded in the decoding process of the SPS quantization matrices). However, the QMatrixFlag may be decoded in the decoding process of the PPS quantization matrices. In this case, the SPS_QMatrix_PresentFlag is decoded without depending on the value of QMatrixFlag.

In addition, in the above example, the matrix data decoder 420 realizes a mechanism for using a copy of an already decoded matrix based on CopyMatrixFlag and CopyMatrixID. However, this is a non-limiting example. Alternatively, the matrix coefficient decoder 407 may always decode matrix data without using a copy matrix.

It is to be noted that a transform process is skipped only when the transform size is 4×4 in the above example. A transform process is always performed on the matrices other than the 4×4 matrix. However, this is a non-limiting example. Alternatively, a transform process is skipped when the transform size is 8×8 or smaller or is skipped for all the matrix sizes.

In the setting of the quantization matrices in this case, 16 is set as not only the coefficients of the 4×4 quantization matrix but also as the coefficients of the 8×8 and larger quantization matrices.

In addition, when the transform skip enable flag indicates 1 in the above example, 16 is set as all the coefficients of the 4×4 quantization matrix. Alternatively, a numerical value other than 16 may be set as all the coefficients of the quantization matrix.

In the above example, the block sizes are determined to be 64×64 at the maximum, and 8×8 at the minimum. However, the block sizes may be larger or smaller. Alternatively, the blocks may have fixed sizes. In addition, transform sizes are not limited to the ones in the above example.

Figure 14:
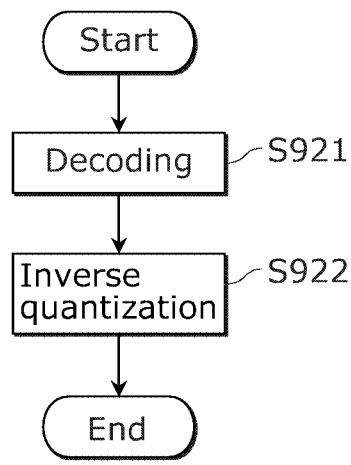
FIG. 14 is a diagram showing a unique operation flow according to Embodiment 2.

FIG. 14 shows unique operations performed by the image decoding apparatus according to the above example. The above example is explained below.

The quantization matrix decoder 302 decodes the first flag, the second flag, and the third flag (S921). The first flag shows whether or not the plurality of quantization matrices each having coefficients different for different frequencies are (selectively) used in an inverse quantization process. The second flag shows whether or not the plurality of quantization matrices are included in the SPS. The second flag shows whether or not the plurality of quantization matrices are included in the PPS.

The inverse quantizing unit 303 performs the inverse quantization process (S922). Here, the inverse quantizing unit 303 performs an inverse quantization process using a plurality of default matrices as a plurality of quantization matrices, when the following are decoded: (i) the first flag indicating that the plurality of quantization matrices are used in the inverse quantization process; (ii) the second flag indicating that the plurality of quantization matrices are not included in the SPS; and (iii) the third flag indicating that the plurality of quantization matrices are not included in the PPS.

In this way, these three flags control use or unuse of the plurality of default matrices. Accordingly, it is possible to increase the coding efficiency. In addition, the fact that the SPS and the PPS do not include any quantization matrix shows use of the plurality of default matrices. Accordingly, error resistance is increased.

Here, to decode the first flag indicating that the plurality of quantization matrices are used in the inverse quantization process specifically means to decode, as the value of the first flag, the value indicating that the plurality of quantization matrices are used in the inverse quantization. This relationship is the same in the decoding of the other flags.

In addition, the other processes may be executed by other apparatuses. An image decoding apparatus does not always include structural elements for the other processes. Alternatively, the image decoding apparatus may arbitrarily perform operations corresponding to the above example.

For example, when the first flag is decoded which indicates that the plurality of quantization matrices are not used in the inverse quantization process, the image decoding apparatus performs an inverse quantization process using a plurality of flat matrices each having the same coefficients instead of the plurality of quantization matrices.

In addition, for example, the image decoding apparatus decodes the first flag indicating that the plurality of quantization matrices are used in the inverse quantization process and the second flag indicating that the plurality of quantization matrices are included in the SPS. In this case, the image decoding apparatus performs the inverse quantization process using the plurality of quantization matrices included in the SPS.

In addition, for example, the image decoding apparatus decodes the first flag indicating that the plurality of quantization matrices are used in the inverse quantization process and the third flag indicating that the plurality of quantization matrices are included in the PPS. In this case, the image decoding apparatus performs the inverse quantization process using the quantization matrices included in the PPS.

In addition, for example, when the parameter set includes an identifier indicating the second quantization matrix as the copy identifier, the image decoding apparatus performs the inverse quantization process using the quantization matrices including the first quantization matrix as which a copy of the second quantization matrix is used.

In addition, for example, when the parameter set includes an identifier indicating the default matrix as the copy identifier, the image decoding apparatus performs the inverse quantization process using the quantization matrices including the first quantization matrix as which a copy of the default matrix is used.

In addition, for example, the image decoding apparatus sets sequence quantization matrices for the sequence and picture quantization matrices for the picture. The image decoding apparatus performs an inverse quantization process on the picture using the picture quantization matrices, when decoding the first flag indicating that the plurality of quantization matrices are used in the inverse quantization process.

In the setting of the sequence quantization matrices, the image decoding apparatus sets the default matrices as the sequence quantization matrices, when decoding the second flag indicating that no quantization matrix is included in the SPS. In the setting of the picture quantization matrices, the image decoding apparatus sets the sequence quantization matrices as the picture quantization matrices, when decoding the third flag indicating that no quantization matrix is included in the PPS.

In addition, for example, the image decoding apparatus decodes quantized data and performs an inverse quantization process on the decoded quantized data.

In addition, for example, the image decoding apparatus decodes (i) a first flag indicating that quantization matrices are used in an inverse quantization process, (ii) a second flag indicating that no quantization matrix is included in an SPS, and (iii) a third flag indicating that no quantization matrix is included in a PPS, and proceeds to the next operation below.

The image decoding apparatus performs the inverse quantization process using flat matrices each having the same coefficients on a block not subject to inverse frequency transform. The image decoding apparatus performs the inverse quantization process using default matrices on a block subject to inverse transform.

The above operations may be arbitrarily combined. In addition, various modifications may be added based on the above example in this embodiment.

In each of the above embodiments, the functional blocks may be realized by MPU and a memory and the like. In addition, the processing by the functional blocks may be realized by software (a program), and the software may be recorded on a recording medium such as a ROM. The software may be distributed by downloading or the like, or may be recorded on recording media such as CD-ROMs and then be distributed. Here, the functional blocks may be realized as hardware (exclusive circuits).

In other words, in each of the above embodiments, each of the structural elements may be configured as exclusive hardware, or may be realized by executing a software program suitable for the structural element. Each of the structural elements may be realized by means of the program executing unit such as a CPU or a processor reading the software program recorded on a recording medium such as a hard disk or a semiconductor memory and executing the software program.

In other words, each of the image coding apparatus and the image decoding apparatus includes processing circuitry and storage electrically connected to the processing circuitry (this storage is accessible from the processing circuitry). The processing circuitry includes at least one of the exclusive hardware and the program executing unit, and executes processing using the storage. In addition, when the processing circuitry includes the program executing unit, the storage stores the software program which is executed by the program executing unit.

Here, the software which realizes the image coding apparatus in each of the embodiments is, for example, a program below.

An exemplary program causes a computer to execute an image coding method according to an aspect of the present invention is an image coding method for coding an image, including: coding (i) coefficient information indicating a plurality of coefficients of one or more blocks included in the image, (ii) a first flag indicating whether or not to quantize the one or more blocks using a plurality of quantization matrices each having coefficients different for different frequencies, (iii) a second flag indicating whether or not the plurality of quantization matrices are included in a sequence parameter set, and (iv) a third flag indicating whether or not the plurality of quantization matrices are included in a picture parameter set; and quantizing the plurality of coefficients, wherein when the one or more blocks are quantized in the quantizing using a plurality of default matrices as the plurality of quantization matrices, the following are coded in the coding: (i) the first flag indicating that the one or more blocks are quantized using the plurality of quantization matrices, (ii) the second flag indicating that the plurality of quantization matrices are not included in the sequence parameter set, and (iii) the third flag indicating that the plurality of quantization matrices are not included in the picture parameter set.

Furthermore, another exemplary program may cause a computer to execute an image decoding method according to an aspect of the present disclosure is an image decoding method for decoding a coded bitstream to decode an image, the image decoding method may include: decoding, from the coded bitstream, (i) coefficient information indicating a plurality of coefficients of one or more blocks included in the image, (ii) a first flag indicating whether or not to inverse-quantize the one or more blocks using a plurality of quantization matrices each having coefficients different for different frequencies, (iii) a second flag indicating whether or not the plurality of quantization matrices are included in a sequence parameter set, and (iv) a third flag indicating whether or not the plurality of quantization matrices are included in a picture parameter set; and inverse-quantizing the coefficient information, wherein when the following may be decoded: (i) the first flag indicating that the one or more blocks are inverse-quantized using the plurality of quantization matrices, (ii) the second flag indicating that the plurality of quantization matrices are not included in the sequence parameter set, and (iii) the third flag indicating that the plurality of quantization matrices are not included in the picture parameter set, the coefficient information may be inverse-quantized in the inverse-quantizing using the plurality of default matrices as the plurality of quantization matrices.

The structural elements may be circuits. All of these circuits may be integrated into a single circuit, or may be configured as separate circuits. Alternatively, each of the structural elements may be realized as a general processor or as an exclusive processor.

Alternatively, a process executed by a particular one of the processing units may be executed by another one of the processing units. Alternatively, the execution order of the processes may be changed, or some of the processes may be executed in parallel. Alternatively, an image coding and decoding apparatus may include the image coding apparatus and the image decoding apparatus.

In addition, the processes described in each of the embodiments may be realized in centralized processing using a single apparatus (system), or may be realized in distributed processing using a plurality of apparatuses. The program may be executed by one or more computers. In other words, one computer may execute the program in centralized processing, or some computers may execute the program in distributed processing.

The non-limiting embodiments have been described above, and the scope of the claims in the present application is not limited to the embodiments. Those skilled in the art will readily appreciate that various modifications may be made in these exemplary embodiments and other embodiments may be obtained by arbitrarily combining the structural elements of the above-described embodiments without materially departing from the novel teaching and advantageous effects of the inventive concept, the scope of which is defined in the appended Claims. Accordingly, the modifications and other embodiments are included in the present disclosure.

[Embodiment 3]

The processing described in each of embodiments can be simply implemented in an independent computer system, by recording, in a recording medium, a program for implementing the configurations of the moving picture coding method (image coding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture coding method (image coding method) and the moving picture decoding method (image decoding method) described in each of embodiments and systems using thereof will be described. The system has a feature of having an image coding and decoding apparatus that includes an image coding apparatus using the image coding method and an image decoding apparatus using the image decoding method. Other configurations in the system can be changed as appropriate depending on the cases.

Figure 15:
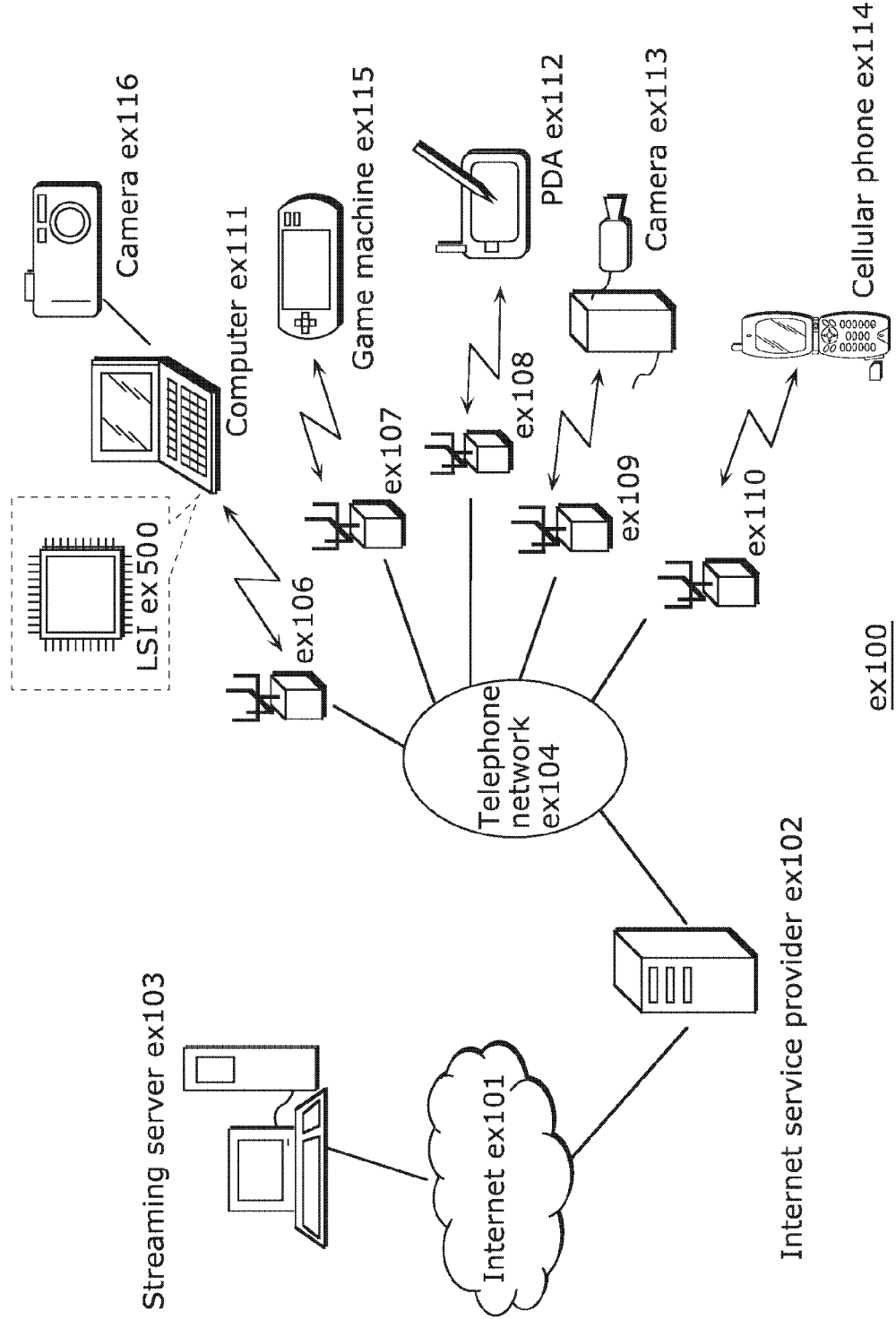
FIG. 15 shows an overall configuration of a content providing system for implementing content distribution services.

FIG. 15 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 15, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of embodiments (i.e., the camera functions as the image coding apparatus according to an aspect of the present disclosure), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (i.e., functions as the image decoding apparatus according to an aspect of the present disclosure).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 16:
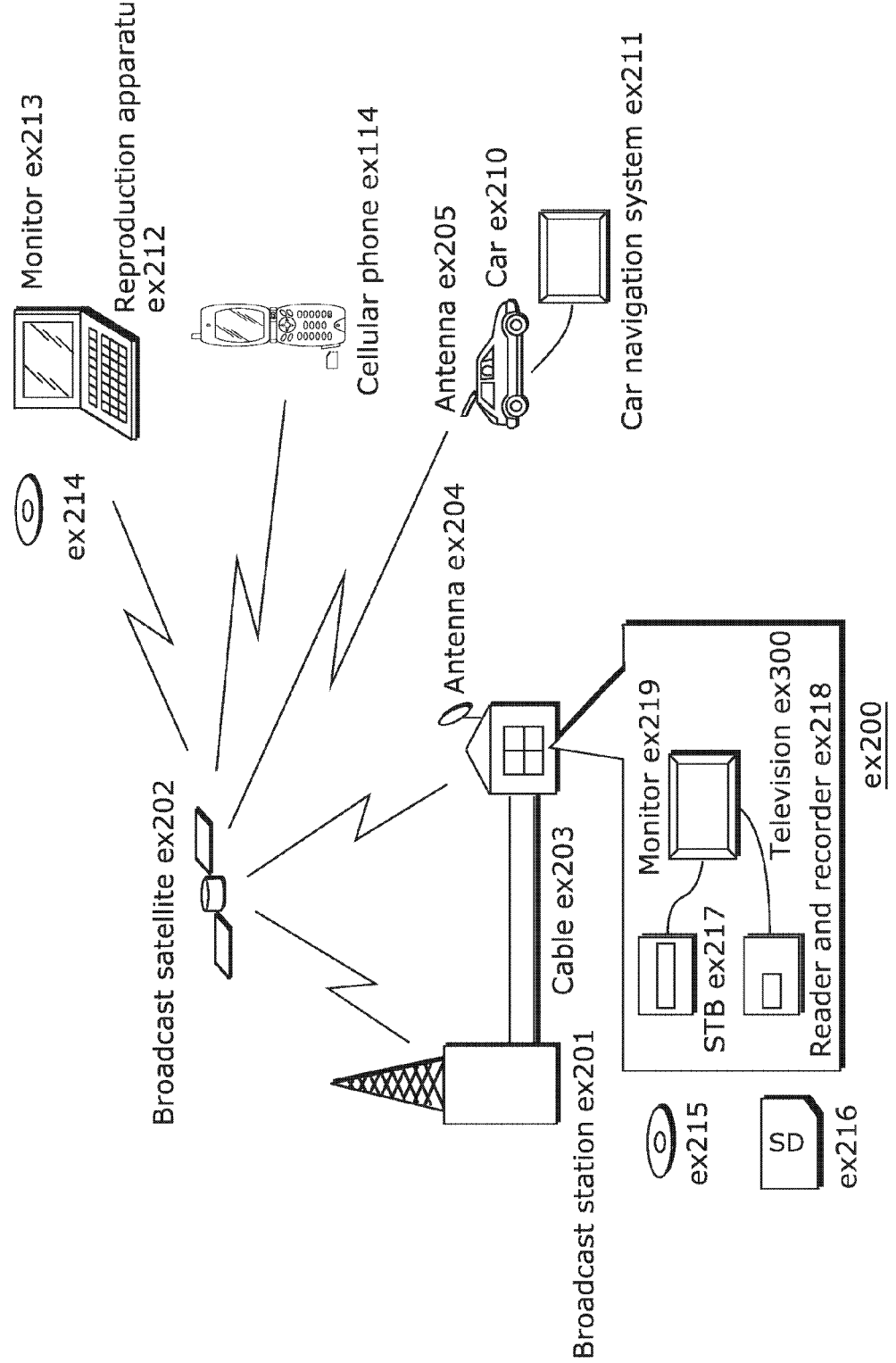
FIG. 16 shows an overall configuration of a digital broadcasting system.

Aside from the example of the content providing system ex100, at least one of the moving picture coding apparatus (image coding apparatus) and the moving picture decoding apparatus (image decoding apparatus) described in each of embodiments may be implemented in a digital broadcasting system ex200 illustrated in FIG. 16. More specifically, a broadcast station ex201 communicates or transmits, via radio waves to a broadcast satellite ex202, multiplexed data obtained by multiplexing audio data and others onto video data. The video data is data coded by the moving picture coding method described in each of embodiments (i.e., data coded by the image coding apparatus according to an aspect of the present disclosure). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present disclosure).

Furthermore, a reader/recorder ex218 (i) reads and decodes the multiplexed data recorded on a recording medium ex215, such as a DVD and a BD, or (i) codes video signals in the recording medium ex215, and in some cases, writes data obtained by multiplexing an audio signal on the coded data. The reader/recorder ex218 can include the moving picture decoding apparatus or the moving picture coding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 17:
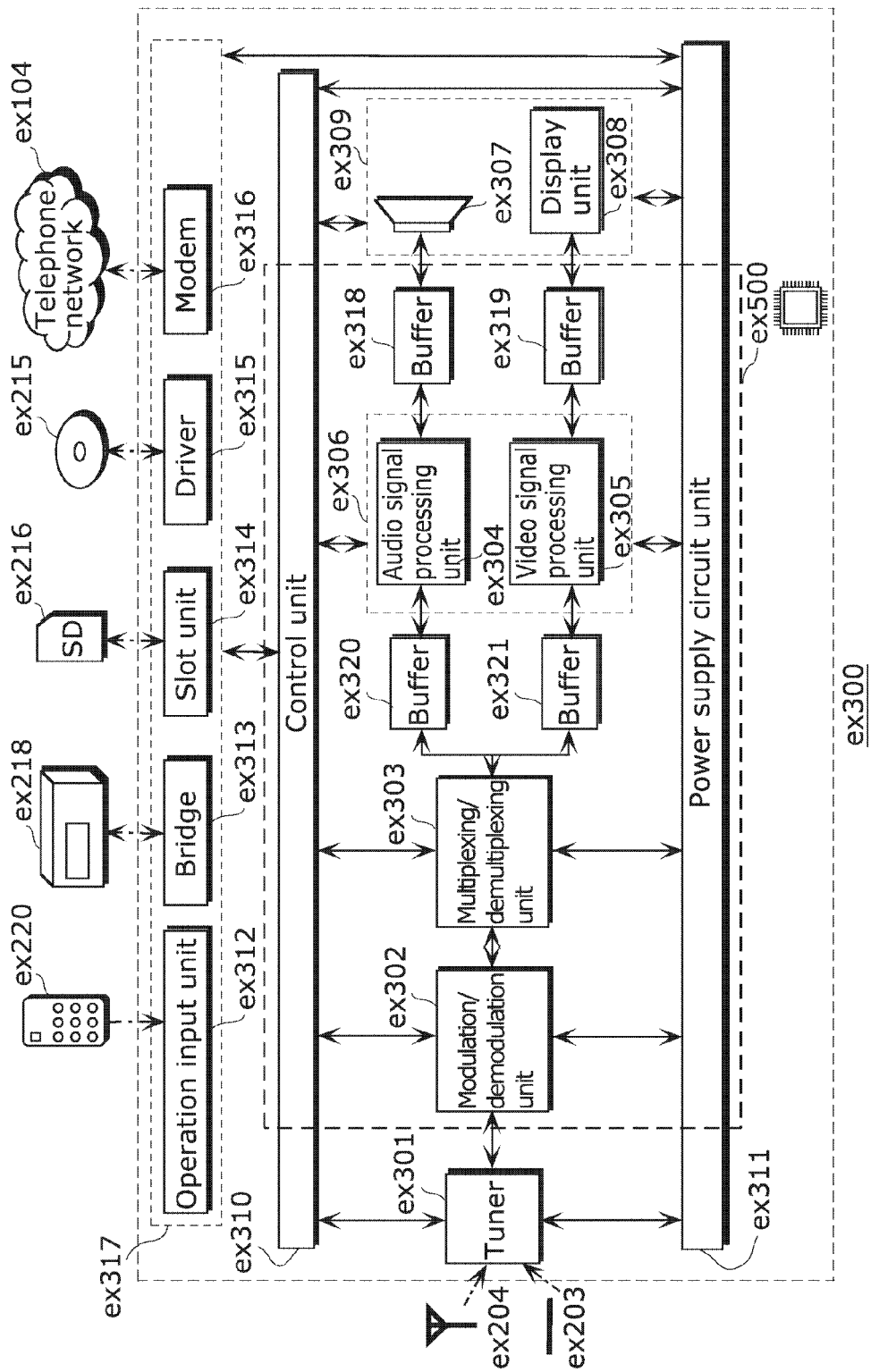
FIG. 17 shows a block diagram illustrating an example of a configuration of a television.

FIG. 17 illustrates the television (receiver) ex300 that uses the moving picture coding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively (which function as the image coding apparatus and the image decoding apparatus according to the aspects of the present disclosure); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 18:
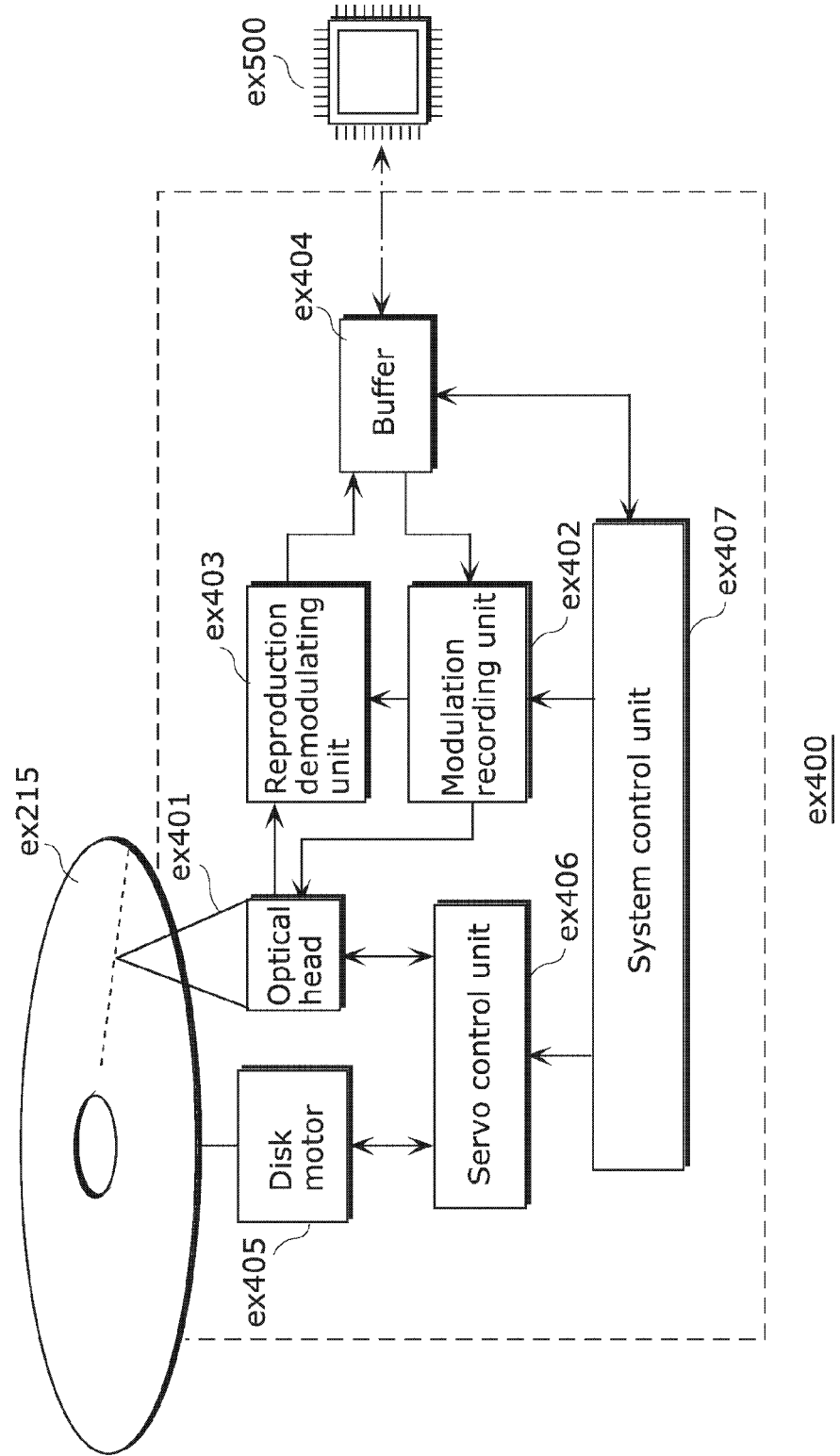
FIG. 18 shows a block diagram illustrating an example of a configuration of an information reproducing/recording unit that reads and writes information from and on a recording medium that is an optical disk.

As an example, FIG. 18 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 19:
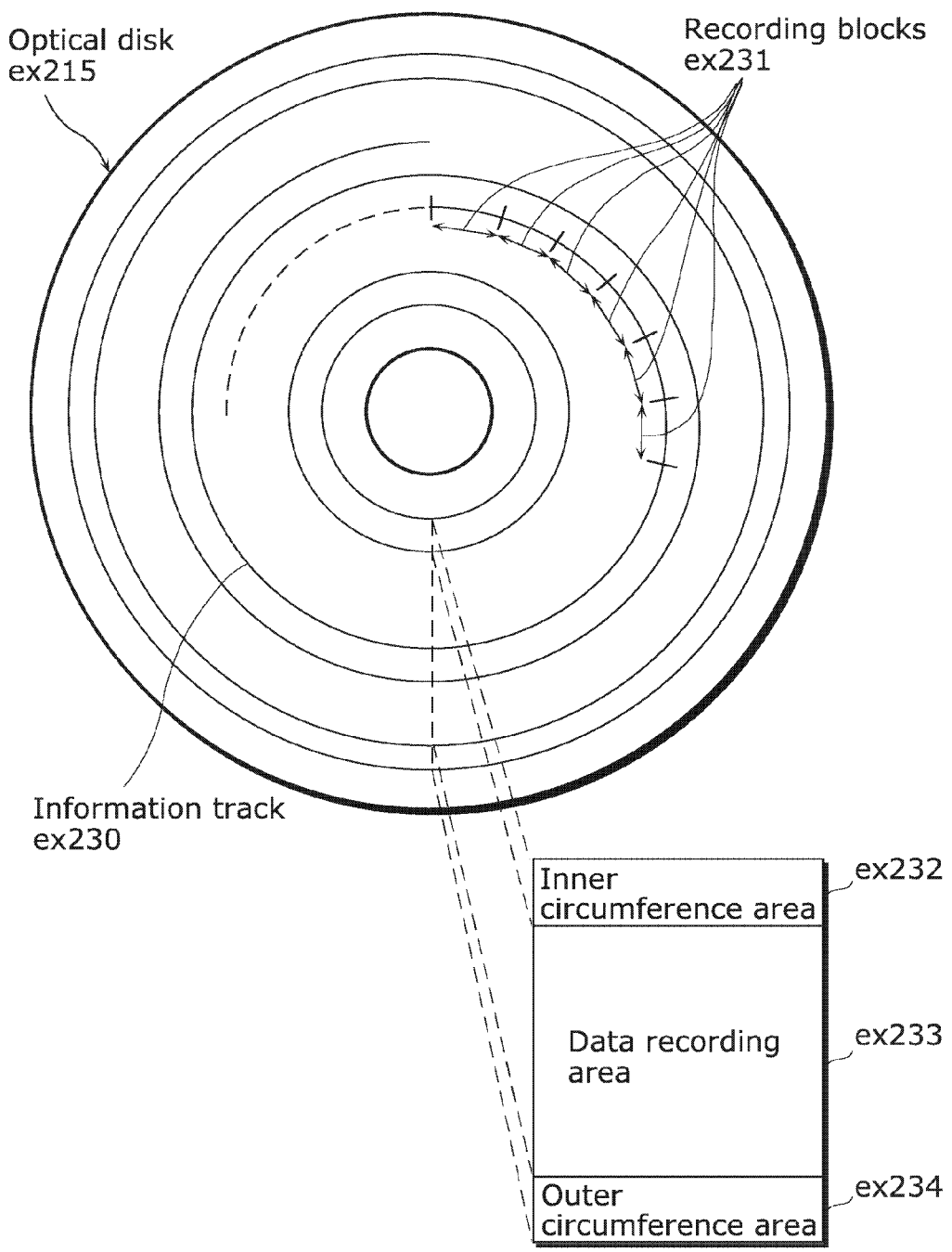
FIG. 19 shows an example of a configuration of a recording medium that is an optical disk.

FIG. 19 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 17. The same will be true for the configuration of the computer ex111, the cellular phone ex114, and others.

Figure 20A:
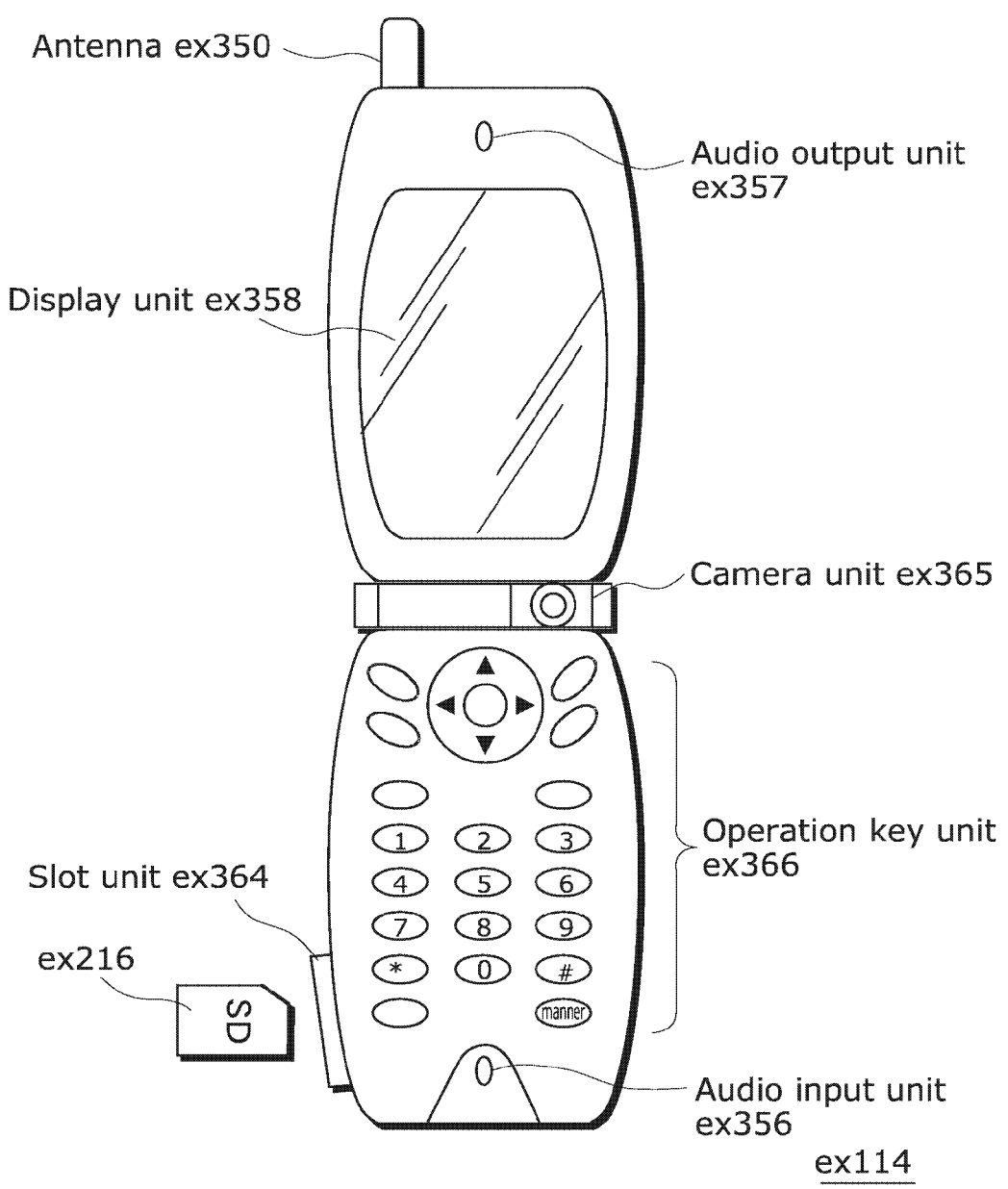
FIG. 20A shows an example of a cellular phone.

FIG. 20A illustrates the cellular phone ex114 that uses the moving picture coding method and the moving picture decoding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Figure 20B:
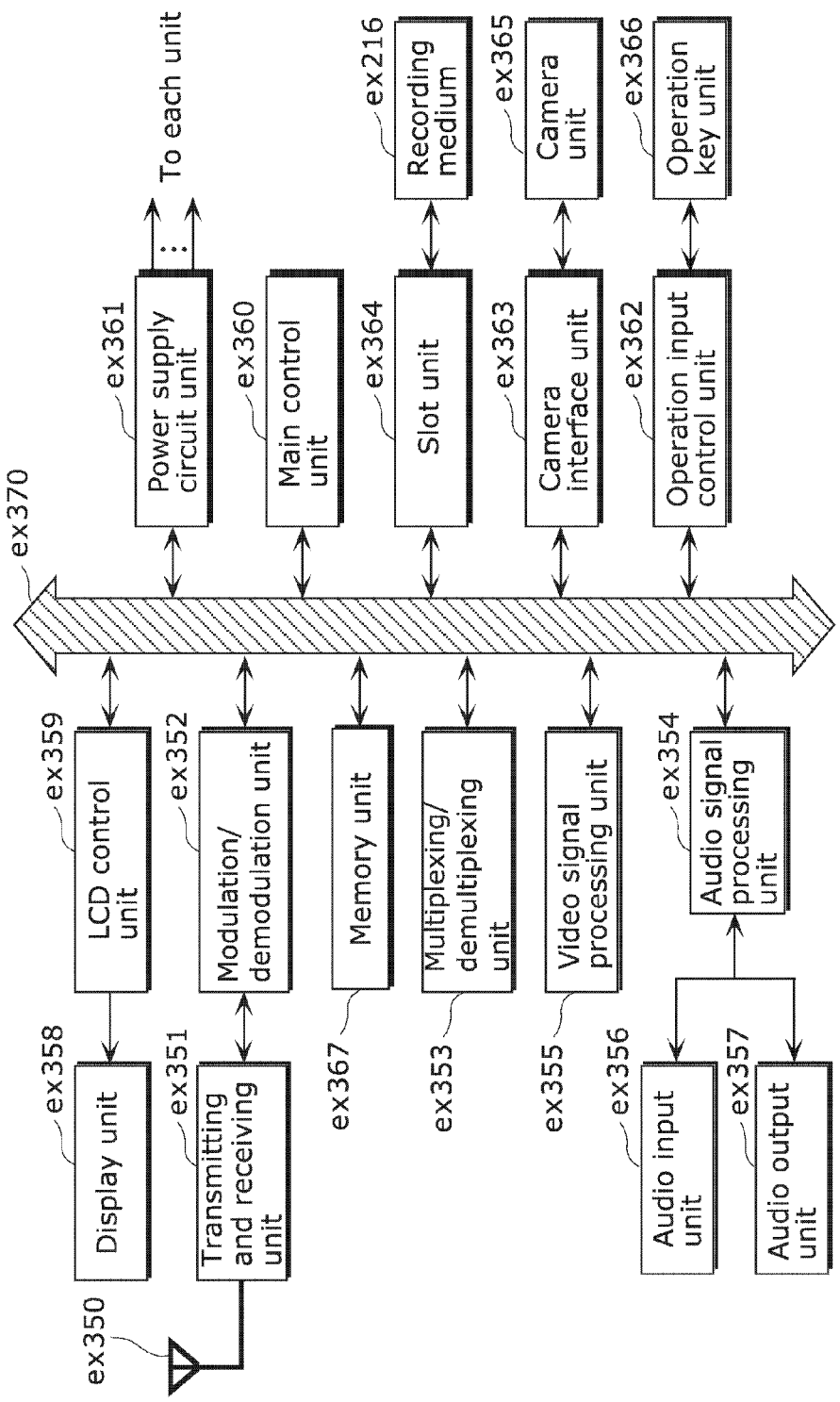
FIG. 20B is a block diagram showing an example of a configuration of a cellular phone.

Next, an example of a configuration of the cellular phone ex114 will be described with reference to FIG. 20B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of embodiments (i.e., functions as the image coding apparatus according to the aspect of the present disclosure), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of embodiments (i.e., functions as the image decoding apparatus according to the aspect of the present disclosure), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of embodiments can be used in any of the devices and systems described. Thus, the advantages described in each of embodiments can be obtained.

Furthermore, various modifications and revisions can be made in any of the embodiments in the present disclosure.

[Embodiment 4]

Video data can be generated by switching, as necessary, between (i) the moving picture coding method or the moving picture coding apparatus shown in each of embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conform cannot be detected, an appropriate decoding method cannot be selected.

In view of this, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of embodiments will be hereinafter described. The multiplexed data is a digital stream in the MPEG-2 Transport Stream format.

FIG. 21 illustrates a structure of the multiplexed data. As illustrated in FIG. 21, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 22:
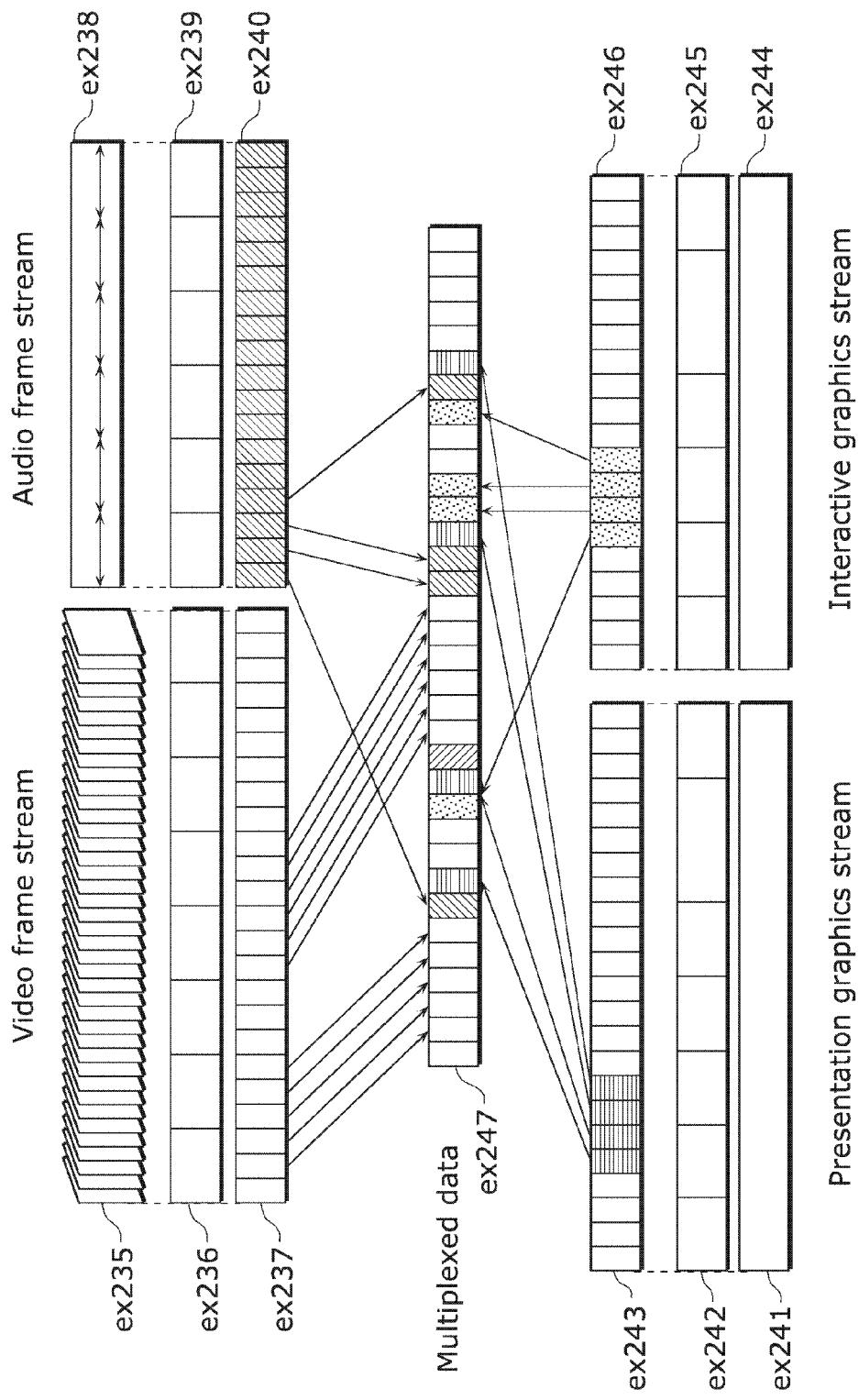
FIG. 22 schematically shows how each stream is multiplexed in multiplexed data.

FIG. 22 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 23:
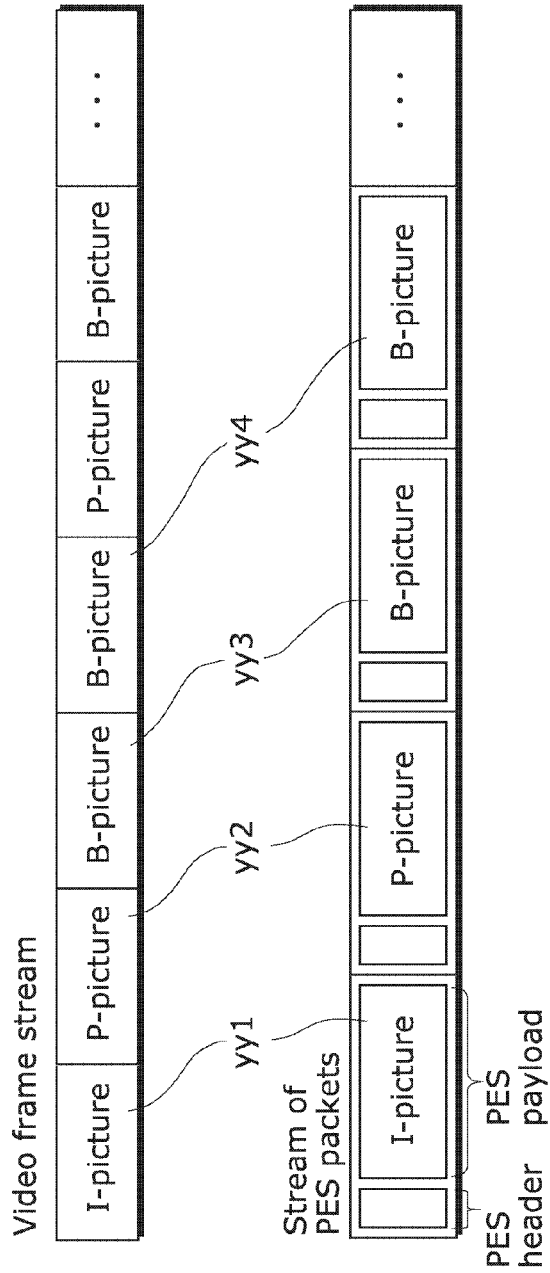
FIG. 23 shows how a video stream is stored in a stream of PES packets in more detail.

FIG. 23 illustrates how a video stream is stored in a stream of PES packets in more detail. The first bar in FIG. 23 shows a video frame stream in a video stream. The second bar shows the stream of PES packets. As indicated by arrows denoted as yy1, yy2, yy3, and yy4 in FIG. 23, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

FIG. 24 illustrates a format of TS packets to be finally written on the multiplexed data Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 24. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 25:
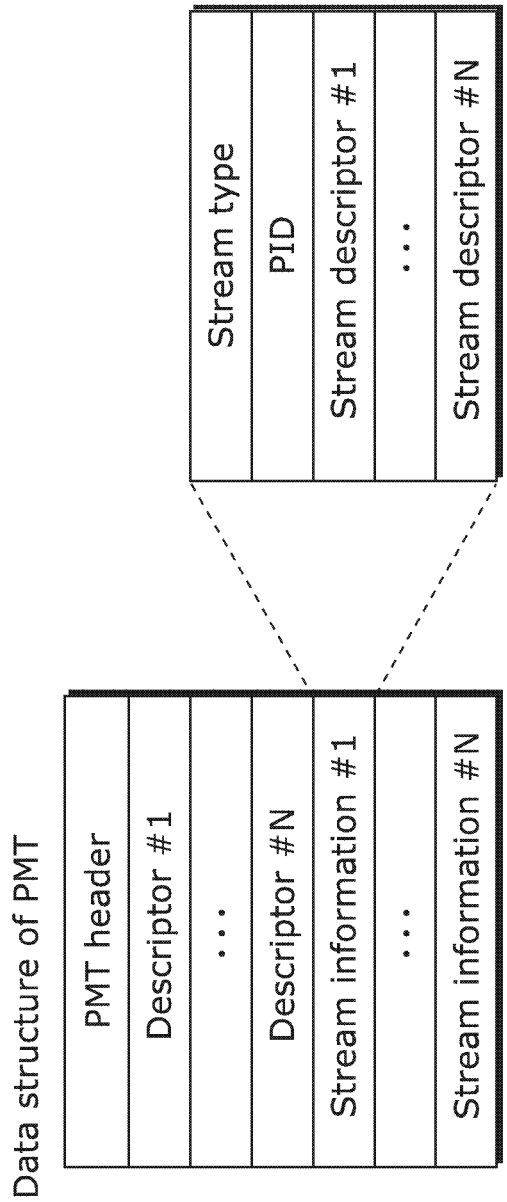
FIG. 25 shows a data structure of a PMT.

FIG. 25 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 26:
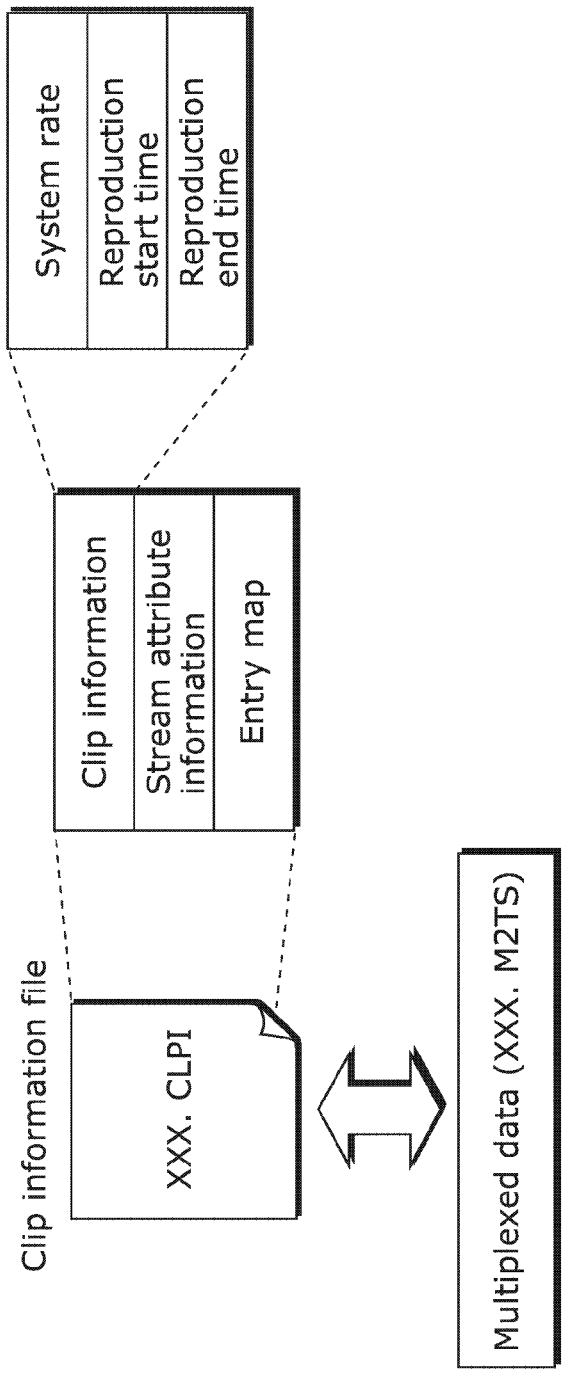
FIG. 26 shows an internal structure of multiplexed data information.

Each of the multiplexed data information files is management information of the multiplexed data as shown in FIG. 26. The multiplexed data information files are in one to one correspondence with the multiplexed data, and each of the files includes multiplexed data information, stream attribute information, and an entry map.

As illustrated in FIG. 26, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 27:
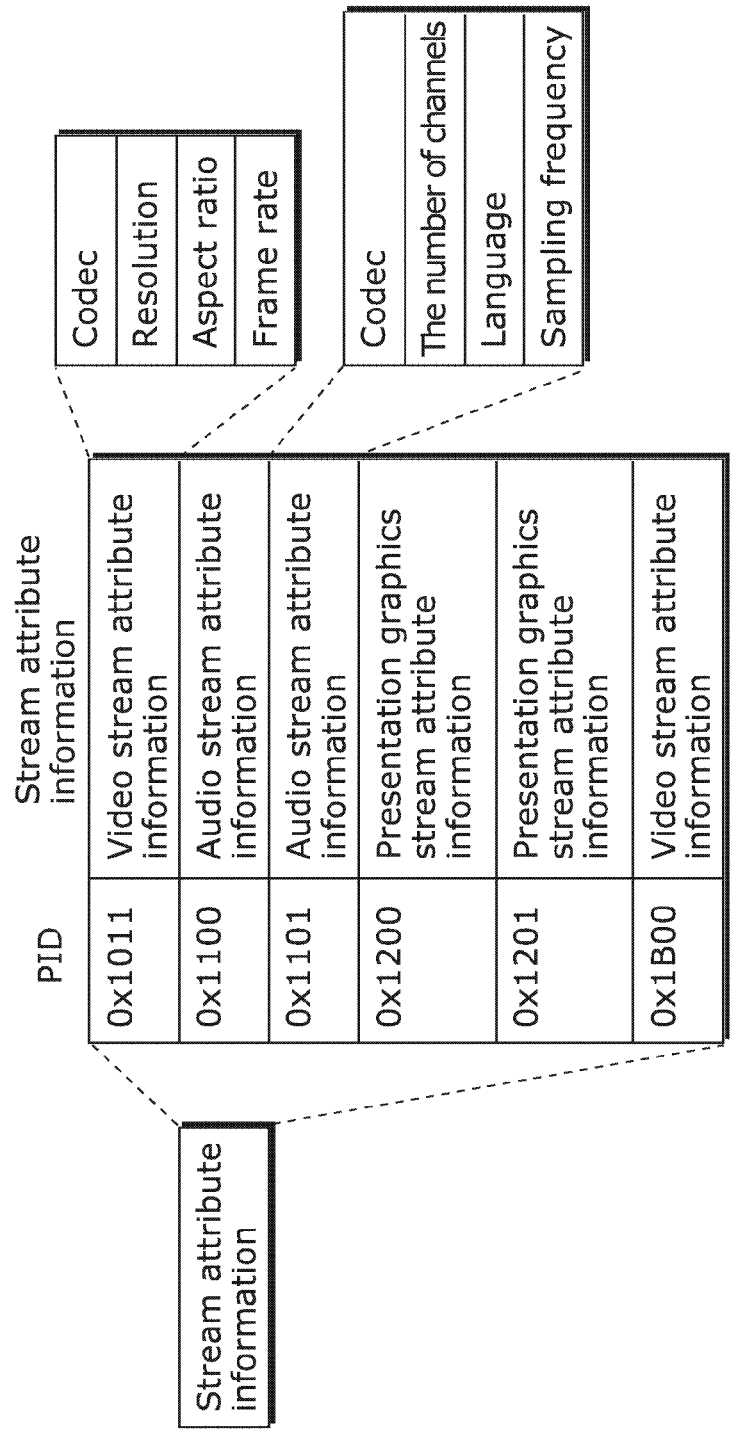
FIG. 27 shows an internal structure of stream attribute information.

As shown in FIG. 27, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of embodiments includes a step or a unit for allocating unique information indicating video data generated by the moving picture coding method or the moving picture coding apparatus in each of embodiments, to the stream type included in the PMT or the video stream attribute information. With the configuration, the video data generated by the moving picture coding method or the moving picture coding apparatus described in each of embodiments can be distinguished from video data that conforms to another standard.

Figure 28:
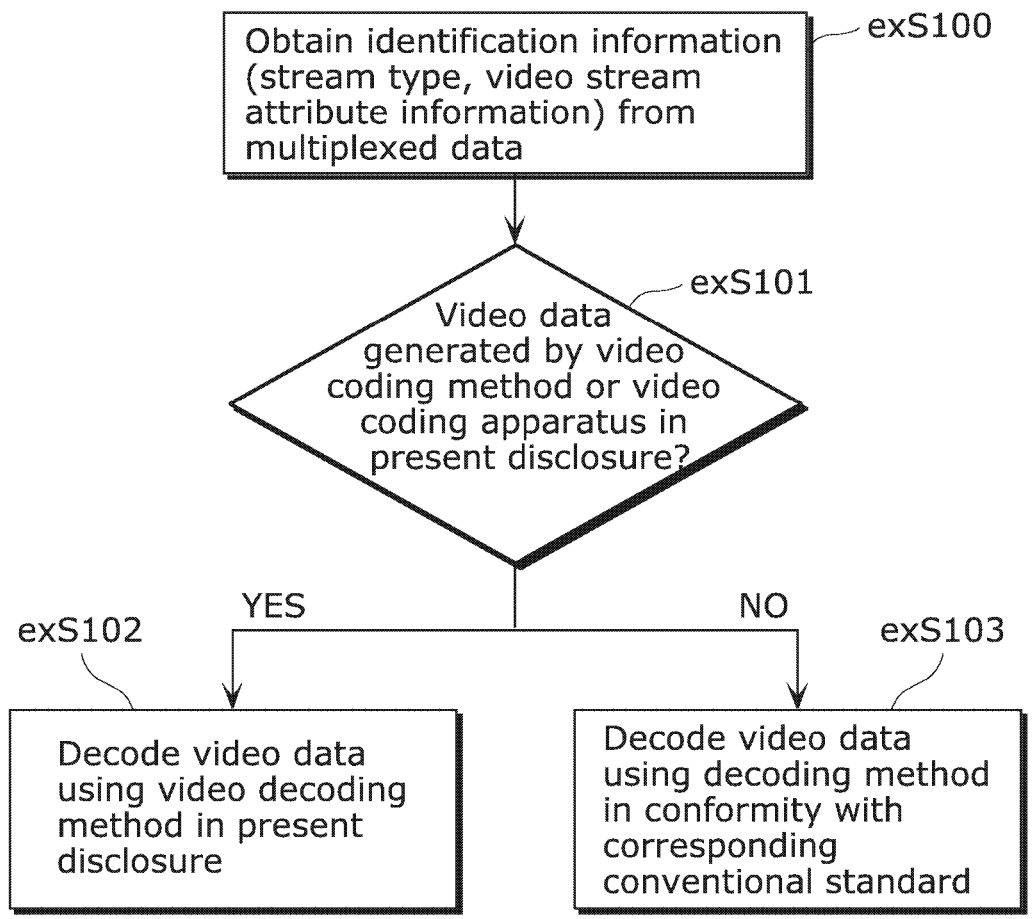
FIG. 28 shows steps for identifying video data.

Furthermore, FIG. 28 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture coding method or the moving picture coding apparatus in each of embodiments. When it is determined that the stream type or the video stream attribute information indicates that the multiplexed data is generated by the moving picture coding method or the moving picture coding apparatus in each of embodiments, in Step exS102, decoding is performed by selecting a reference picture or a motion vector from candidates according to the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture coding method or apparatus, or the moving picture decoding method or apparatus in the present embodiment can be used in the devices and systems described above.

[Embodiment 5]

Figure 29:
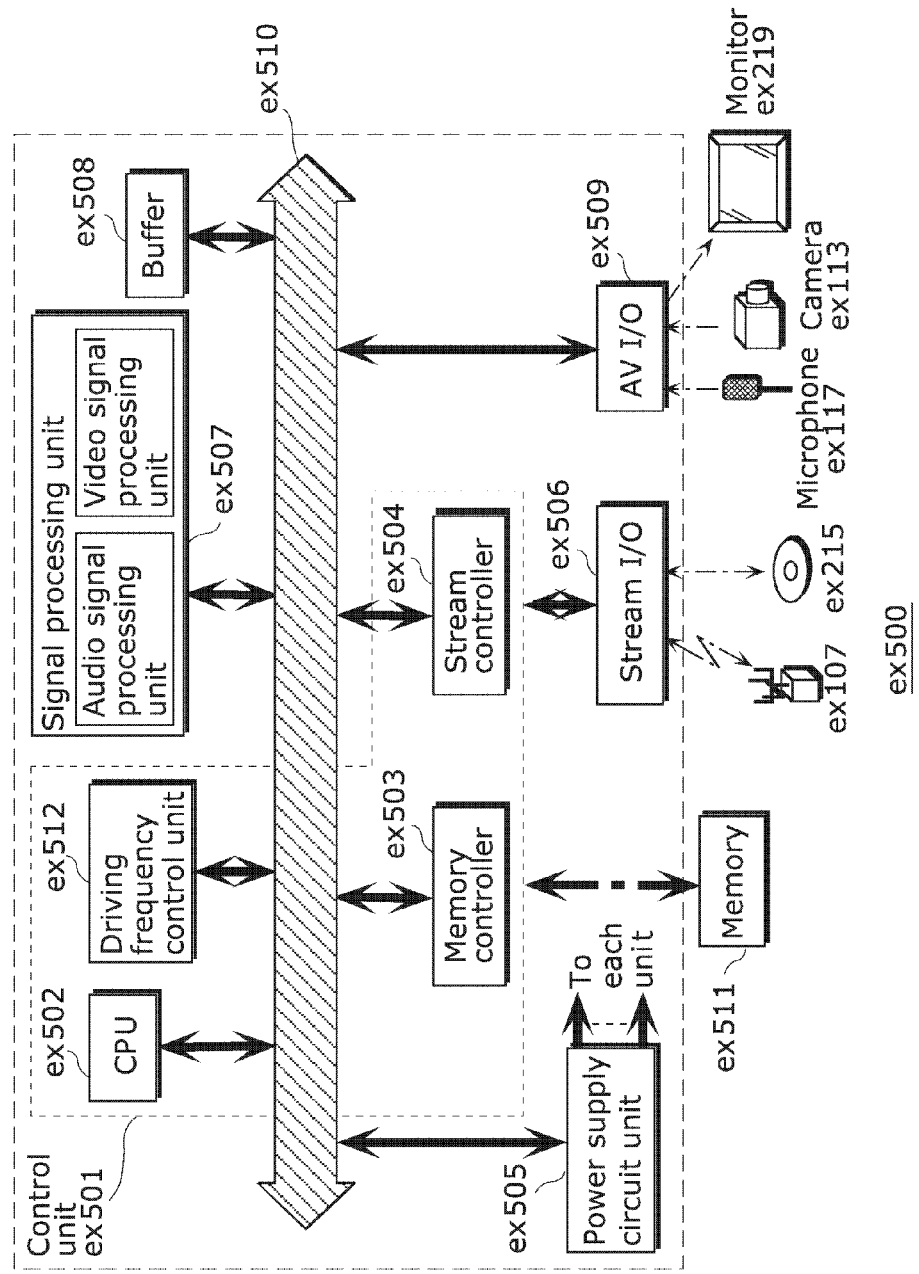
FIG. 29 shows an example of a configuration of an integrated circuit for implementing the moving picture coding method and the moving picture decoding method according to each of embodiments.

Each of the moving picture coding method, the moving picture coding apparatus, the moving picture decoding method, and the moving picture decoding apparatus in each of embodiments is typically achieved in the form of an integrated circuit or a Large Scale Integrated (LSI) circuit. As an example of the LSI, FIG. 29 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose. Such a programmable logic device can typically execute the moving picture coding method and/or the moving picture decoding method according to any of the above embodiments, by, loading or reading from a memory or the like one or more programs that are included in software or firmware.

In the future, with advancement in semiconductor technology, a brand-new technology may replace LSI. The functional blocks can be integrated using such a technology. The possibility is that the present disclosure is applied to biotechnology.

[Embodiment 6]

When video data generated in the moving picture coding method or by the moving picture coding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, the power consumption increases.

Figure 30:
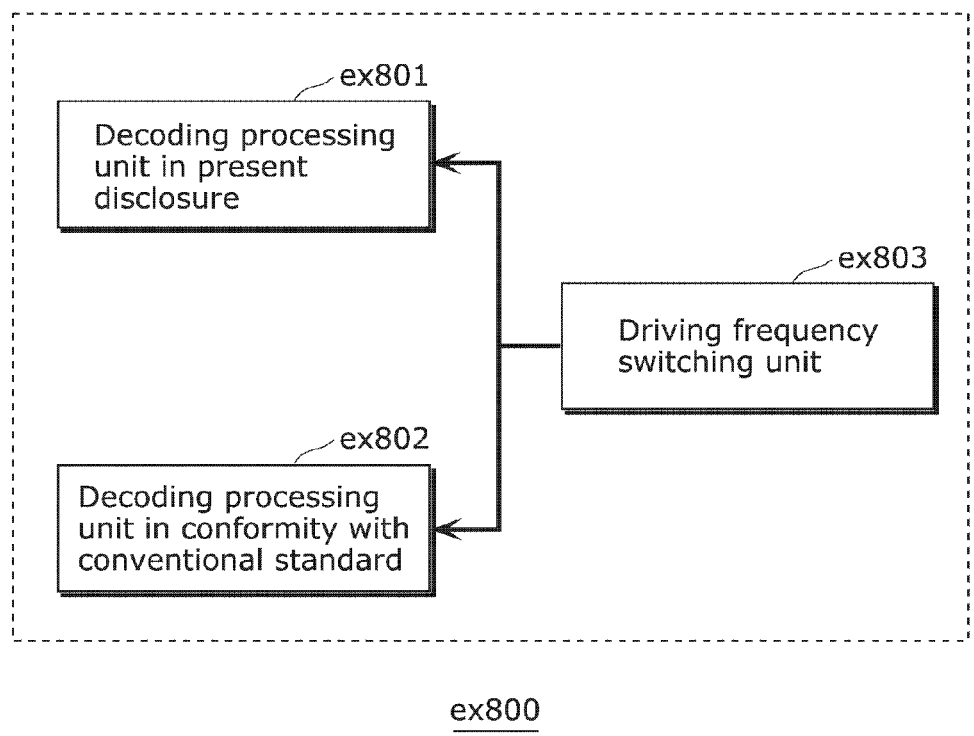
FIG. 30 shows a configuration for switching between driving frequencies.

In view of this, the moving picture decoding apparatus, such as the television ex300 and the LSI ex500 is configured to determine to which standard the video data conforms, and switch between the driving frequencies according to the determined standard. FIG. 30 illustrates a configuration ex800 in the present embodiment. A driving frequency switching unit ex803 sets a driving frequency to a higher driving frequency when video data is generated by the moving picture coding method or the moving picture coding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 29. Here, each of the decoding processing unit ex801 that executes the moving picture decoding method described in each of embodiments and the decoding processing unit ex802 that conforms to the conventional standard corresponds to the signal processing unit ex507 in FIG. 29. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 4 is probably used for identifying the video data. The identification information is not limited to the one described in Embodiment 4 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 32. The driving frequency can be selected by storing the look-up table in the buffer ex508 and in an internal memory of an LSI, and with reference to the look-up table by the CPU ex502.

Figure 31:
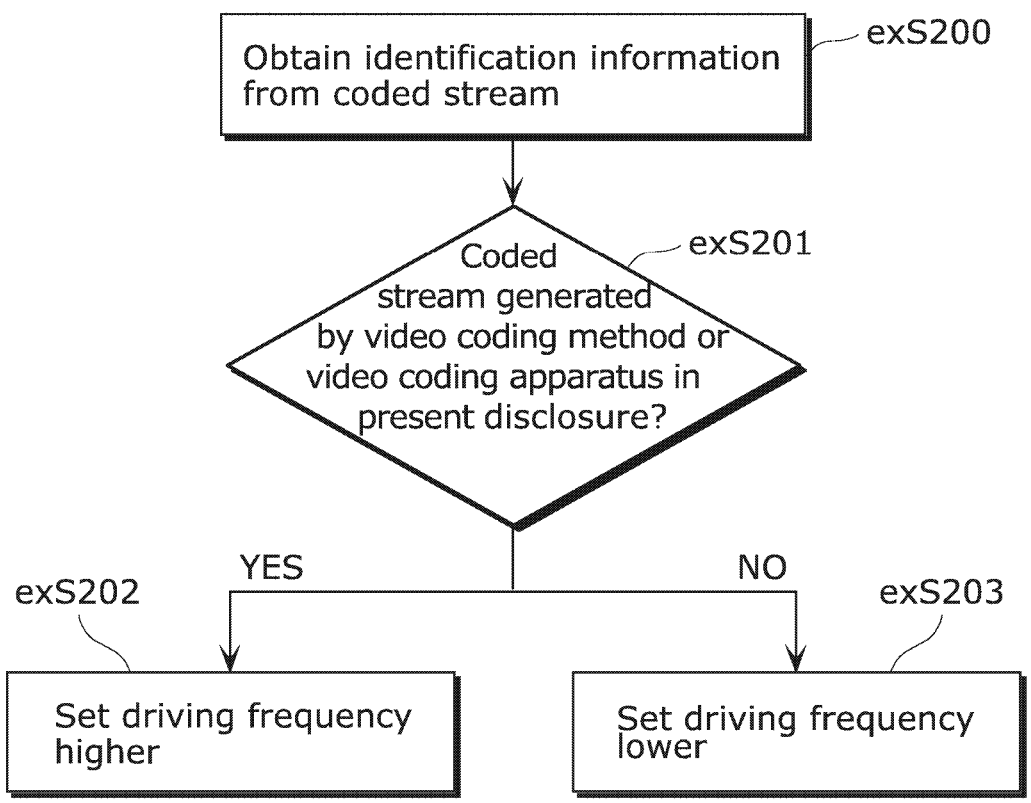
FIG. 31 shows steps for identifying video data and switching between driving frequencies.

FIG. 31 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the moving picture coding method and the moving picture coding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture coding method and the moving picture coding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture coding method and the moving picture coding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture coding method and the moving picture coding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

[Embodiment 7]

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, increase in the scale of the circuit of the LSI ex500 and increase in the cost arise with the individual use of the signal processing units ex507 that conform to the respective standards.

Figure 33A:
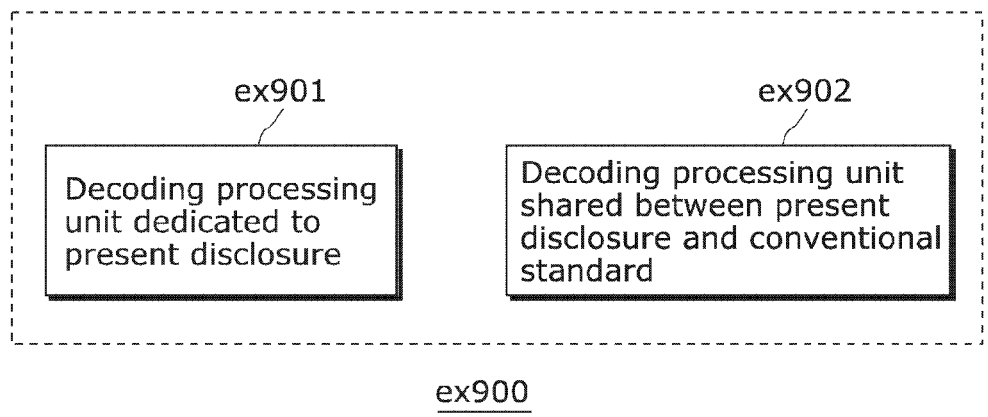
FIG. 33A is a diagram showing an example of a configuration for sharing a module of a signal processing unit.

In view of this, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 33A shows an example of the configuration. For example, the moving picture decoding method described in each of embodiments and the moving picture decoding method that conforms to MPEG-4 AVC have, partly in common, the details of processing, such as entropy coding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing which is unique to an aspect of the present disclosure and does not conform to MPEG-4 AVC. Since the aspect of the present disclosure is characterized by entropy decoding and inverse quantization in particular, for example, the dedicated decoding processing unit ex901 is used for entropy decoding and inverse quantization.

Otherwise, the decoding processing unit is probably shared for one of the deblocking filtering, motion compensation, and inverse frequency transform, or all of the processing. The decoding processing unit for implementing the moving picture decoding method described in each of embodiments may be shared for the processing to be shared, and a dedicated decoding processing unit may be used for processing unique to that of MPEG-4 AVC.

Figure 33B:
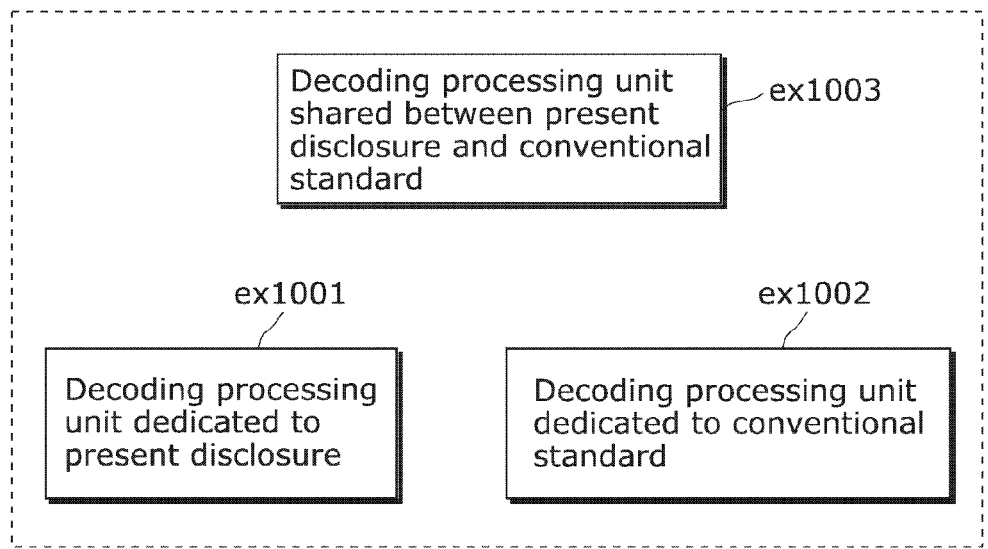
FIG. 33B is a diagram showing another example of a configuration for sharing a module of the signal processing unit.

Furthermore, ex1000 in FIG. 33B shows another example in that processing is partly shared. This example uses a configuration including a dedicated decoding processing unit ex1001 that supports the processing unique to an aspect of the present disclosure, a dedicated decoding processing unit ex1002 that supports the processing unique to another conventional standard, and a decoding processing unit ex1003 that supports processing to be shared between the moving picture decoding method according to the aspect of the present disclosure and the conventional moving picture decoding method. Here, the dedicated decoding processing units ex1001 and ex1002 are not necessarily specialized for the processing according to the aspect of the present disclosure and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present disclosure and the moving picture decoding method in conformity with the conventional standard.

Industrial Applicability

The present disclosure is applicable to, for example, television receivers, digital video recorders, car navigation systems, mobile phones, digital cameras, digital video cameras, and so on.

The invention claimed is:

1. An image coding method for coding an image, comprising:
    quantizing a plurality of coefficients included in a plurality of blocks included in the image; and
    coding coefficient information indicating the plurality of coefficients, and quantization information which is used in the quantizing,
    wherein the quantization information includes at least one of: (i) a first flag indicating whether or not the plurality of blocks are quantized using a plurality of quantization matrices each having coefficients respectively corresponding to the plurality of coefficients, (ii) a second flag indicating whether or not the plurality of quantization matrices are included in a sequence parameter set, and (iii) a third flag indicating whether or not the plurality of quantization matrices are included in a picture parameter set, and
    when all of the plurality of blocks are quantized in the quantizing using only a plurality of default matrices as the plurality of quantization matrices, only the following are coded as the quantization information in the coding, indicating that the quantizing is performed using only the plurality of default matrices: (i) the first flag indicating that the plurality of are quantized using the plurality of quantization matrices, (ii) the second flag indicating that the plurality of quantization matrices are not included in the sequence parameter set, and (iii) the third flag indicating that the plurality of quantization matrices are not included in the picture parameter set.

2. An image coding apparatus which codes an image, the apparatus comprising:
    processing circuitry; and
    storage accessible from the processing circuitry,
    wherein the processing circuitry executes, using the storage, an image coding method including:
    quantizing a plurality of coefficients included in a plurality of blocks included in the image; and
    coding coefficient information indicating the plurality of coefficients, and quantization information which is used in the quantizing,
    wherein the quantization information includes at least one of: (i) a first flag indicating whether or not the plurality of blocks are quantized using a plurality of quantization matrices each having coefficients respectively corresponding to the plurality of coefficients, (ii) a second flag indicating whether or not the plurality of quantization matrices are included in a sequence parameter set, and (iii) a third flag indicating whether or not the plurality of quantization matrices are included in a picture parameter set, and
    when all of the plurality blocks are quantized in the quantizing using only a plurality of default matrices as the plurality of quantization matrices, only the following are coded as the quantization information in the coding, indicating that the quantizing is performed using only the plurality of default matrices: (i) the first flag indicating that plurality of blocks are quantized using the plurality of quantization matrices, (ii) the second flag indicating that the plurality of quantization matrices are not included in the sequence parameter set, and (iii) the third flag indicating that the plurality of quantization matrices are not included in the picture parameter set.

3. An image coding apparatus which codes an image, comprising:
    a quantizing unit configured to quantize a plurality of coefficients included in a plurality of blocks included in the image; and
    an encoder which codes coefficient information indicating the plurality of coefficients, and quantization information which is used in the quantizing,
    wherein the quantization information includes at least one of: (i) a first flag indicating whether or not the plurality of blocks are quantized using a plurality of quantization matrices each having coefficients respectively corresponding to the plurality of coefficients, (ii) a second flag indicating whether or not the plurality of quantization matrices are included in a sequence parameter set, and (iii) a third flag indicating whether or not the plurality of quantization matrices are included in a picture parameter set, and
    when the quantizing unit is configured to quantize all of the plurality of blocks using only a plurality of default matrices as the plurality of quantization matrices, the encoder is configured to code only the following as the quantization information, indicating that the quantizing is performed using only the plurality of default matrices: (i) the first flag indicating that the plurality of blocks are quantized using the plurality of quantization matrices, (ii) the second flag indicating that the plurality of quantization matrices are not included in the sequence parameter set, and (iii) the third flag indicating that the plurality of quantization matrices are not included in the picture parameter set.

* * * * *